United States Patent
Hata et al.

[11] Patent Number: 5,875,691
[45] Date of Patent: Mar. 2, 1999

[54] HYBRID DRIVE SYSTEM

[75] Inventors: Hiroshi Hata, Toyota; Seitoku Kubo, Toyota; Yutaka Taga, Aichi-gun; Ryuji Ibaraki, Toyota, all of Japan

[73] Assignee: Toyota Jidosha Kabushiki Kaisha, Toyota, Japan

[21] Appl. No.: 758,722

[22] Filed: Dec. 3, 1996

[30] Foreign Application Priority Data

Dec. 6, 1995 [JP] Japan ................................. 7-344937

[51] Int. Cl.⁶ .................................................. B60K 6/00
[52] U.S. Cl. .............................. 74/661; 475/5; 477/5; 477/8
[58] Field of Search ................ 74/661, 333, 606 R; 475/1, 5; 192/4 A; 184/11.3; 477/3, 5, 7, 8

[56] References Cited

U.S. PATENT DOCUMENTS

| | | |
|---|---|---|
| 4,518,070 | 5/1985 | Ooka . |
| 5,285,111 | 2/1994 | Sherman ................................ 475/5 X |
| 5,309,789 | 5/1994 | Kameda et al. ..................... 074/606 R |
| 5,389,047 | 2/1995 | Aklyama ............................. 192/4 A X |
| 5,396,968 | 3/1995 | Hasebe et al. ...................... 192/4 A X |
| 5,415,603 | 5/1995 | Tuzuki et al. . |
| 5,467,668 | 11/1995 | Kameda et al. ..................... 074/606 R |
| 5,492,189 | 2/1996 | Kriegler et al. ........................ 477/2 X |
| 5,509,329 | 4/1996 | Jackson et al. ..................... 074/606 R |
| 5,526,909 | 6/1996 | Ohkawa ................................. 192/4 A |
| 5,558,588 | 9/1996 | Schmidt ..................................... 475/5 |
| 5,558,589 | 9/1996 | Schmidt ..................................... 475/5 |
| 5,562,565 | 10/1996 | Moroto et al. ............................. 477/3 |
| 5,569,108 | 10/1996 | Cadee et al. ............................... 475/1 |
| 5,571,058 | 11/1996 | Schmidt ..................................... 475/5 |
| 5,643,119 | 7/1997 | Yamaguchi et al. ....................... 475/5 |

FOREIGN PATENT DOCUMENTS

A-528412 2/1993 European Pat. Off. .
A-4-102202 8/1991 Germany .

Primary Examiner—Dirk Wright
Assistant Examiner—Peter T. Kwon
Attorney, Agent, or Firm—Oliff & Berridge, PLC

[57] ABSTRACT

A hybrid drive system for outputting the power of an internal combustion engine and the power of a motor generator through a transmission. The transmission includes an input shaft and an output shaft. The motor generator is arranged to have an input/output motor shaft in parallel with the input shaft and the output shaft. The internal combustion engine is arranged to have its output crankshaft on the same axis as that of the input shaft.

37 Claims, 20 Drawing Sheets

FIG. 4

| MODE | GEAR | MAIN CLUTCH | FIRST CLUTCH | SECOND CLUTCH | FIRST SYNCHRONIZING MECHANISM FIRST DRIVEN | SECOND DRIVEN | SECOND SYNCHRONIZING MECHANISM FOURTH DRIVEN | THIRD DRIVEN | REMARKS |
|---|---|---|---|---|---|---|---|---|---|
| 1 (ENGINE) | 1ST | ○ |  |  | ○ |  |  |  |  |
|  | 2ND | ○ | ○ | ○ |  |  | ○ |  |  |
|  | 3RD | ○ | ○ | ○ |  | ○ |  |  |  |
|  | 4TH | ○ | ○ |  |  |  |  | ○ |  |
|  | R |  |  |  | ○ |  |  |  | MOTOR INVERTED |
| 2 (MOTOR) | 1ST |  | ○ | ○ | ○ |  |  |  |  |
|  | 2ND |  | ○ | ○ |  | ○ |  |  |  |
|  | 3RD |  | ○ | ○ |  |  | ○ |  |  |
|  | 4TH |  | ○ | ○ |  |  |  | ○ |  |
|  | P | ○ |  |  |  |  |  |  | REGENERATOIN DEDICATED |
|  | N | ○ |  |  |  |  |  |  | REGENERATOIN DEDICATED |
| 3 (ENGINE +MOTOR) | 1ST | ○ | ○ |  | ○ |  |  |  |  |
|  | 2ND | ○ | ○ |  |  | ○ |  |  |  |
|  | 3RD | ○ | ○ | ○ |  |  | ○ |  |  |
|  | 4TH | ○ | ○ | ○ |  |  |  | ○ |  |

⇐ FORWARD   BACKWARD ⇨

FIG. 14

| | | MAIN CLUTCH | REVERSE CLUTCH | MOTOR SHAFT CLUTCH | FIRST CLUTCH | SECOND CLUTCH | FIRST SYNCHRONIZING MECHANISM | | FIRST SYNCHRONIZING MECHANISM | | SECOND SYNCHRONIZING MECHANISM | |
|---|---|---|---|---|---|---|---|---|---|---|---|---|
| | | | | | | | FIRST DRIVEN | SECOND DRIVEN | SECOND DRIVEN | THIRD DRIVEN | THIRD DRIVEN | FOURTH DRIVEN |
| P | | | | | | | | | | | | |
| N | | | | | | | | | | | | |
| MODE 1 | R | ○ | ○ | | | | ○ | | | | | |
| | 1ST | ○ | | ○ | | | ○ | | | | | |
| | 2ND | ○ | | ○ | ○ | ○ | | | | | | |
| | 3RD | ○ | | ○ | ○ | | | ○ | | | | |
| | 4TH | ○ | | ○ | ○ | | | | | | ○ | |
| MODE 2 | R | | ○ | ○ | | | ○ | | | | | |
| | 1ST | | | ○ | | ○ | ○ | | | | | |
| | 2ND | | | ○ | ○ | ○ | | | | | | |
| | 3RD | | | ○ | | ○ | | ○ | | | | |
| | 4TH | | | ○ | | ○ | | | | | ○ | |
| MODE 3 | R | | ○ | ○ or × | | ○ | ○ | | | | | |
| | 1ST | | | ○ or × | ○ | | ○ | | | | | |
| | 2ND | | | ○ or × | ○ | | | | | ○ | | |
| | 3RD | | | ○ or × | ○ | | | ○ | | | | |
| | 4TH | | | ○ or × | ○ | | | | | | | ○ |

HYBRID DRIVE SYSTEM

BACKGROUND OF THE INVENTION

1. Field of the Invention

The present invention relates to a hybrid drive system which is equipped with two kinds of power sources of an internal combustion engine and a motor generator so that it can use one of the power sources solely or two of them together in accordance with the using condition.

2. Related Art

One example of the hybrid drive system to be used in an electric car or the like of the prior art is disclosed in JPA-3-121928. In this hybrid drive system, there are arranged in series an internal combustion engine to be operated by the thermal energy, a motor generator to be operated by the electric energy of a battery, and a transmission for converting the torque outputted from the internal combustion engine or the motor generator.

The drive shaft of the internal combustion engine, i.e., the crankshaft is connected to the motor shaft of the motor generator, which is connected to the input shaft in the transmission. Incidentally, this transmission is equipped therein with an output shaft which is connected to the input shaft through a gear train. In accordance with the running condition of the vehicle, moreover, at least either the internal combustion engine or the motor generator is driven to generate an output torque. This output torque is transmitted to and transformed by the transmission, so that the converted torque can be transmitted to the wheels thereby to select a variety of running modes.

In the hybrid drive system thus disclosed in the aforementioned JPA-3-121928, however, the internal combustion engine, the motor generator and the transmission are arranged in series. As a result, the drive shaft, the motor shaft and the input shaft are arranged on the common axis to enlarge the total length of the hybrid drive system in the axial direction. This arrangement raises the floor of the vehicle in the compartment thereby to raise such problems in the inferior mountability that the compartment space is narrowed or that the arrangement of the peripheral devices is restricted.

SUMMARY OF THE INVENTION

A main object of the present invention is to provide a hybrid drive system capable of shortening its total length.

Another object of the present invention is to improve the efficiency of the motor generator, i.e., one of the power sources and to reduce the size of the entire system.

In the hybrid drive system premised by the present invention, the power of the internal combustion engine and the power of the motor generator are outputted through the transmission. In the hybrid drive system of this invention, moreover, the transmission is equipped with an input shaft and an output shaft, and the motor generator is arranged to have its input/output motor shaft in parallel with the input shaft or the output shaft. Moreover, the internal combustion engine is arranged to have its output drive shaft on the same axis as the motor shaft or the input shaft.

In this hybrid drive system, therefore, the input shaft or the output shaft and the motor shaft are arranged in parallel, and the transmission and the motor are arranged in parallel so that the total length of the hybrid drive system can be shortened in the axial direction. As a result, there are achieved effects that the mountability of the hybrid drive system for the vehicle are improved and the arrangement of the peripheral devices is less restricted, and that the floor of the vehicle is flattened in the compartment to improve the accommodation of the compartment.

In the present invention, moreover, an input member for transmitting the power to the input shaft and an output member for outputting the power from the output shaft are arranged in the same position, as taken in the axial direction. In other words, these members are arranged by making effective use of the space between these input and output members at the outer circumferential side so that the length of the drive system is reduced in its entirety.

In the hybrid drive system of the present invention, moreover, a motor case accommodating the motor generator liquid-tight is integrally disposed in the housing of the transmission. As a result, the entirety of the drive system can be small-sized, and the motor generator can be cooled with the oil but kept away from any oil invasion. As a result, the motor generator can be given a high output torque and run highly efficiently.

Especially when a rotary member such as a chain is to be lubricated with the oil which is splashed by a rotary member, the cooling effect can be raised by guiding the oil into the motor case by a guide member.

In the present invention, moreover, of the members such as the gears to be arrayed on the shaft of the transmission, the members having the larger diameters are separately arranged at the two end sides of that shaft, and the motor generator is arranged between the larger-diameter members. As a result, the transmission and the motor generator can be radially arranged close to each other so that the drive system can be small-sized as a whole.

In the present invention, moreover, it is possible to provide a main clutch for transmitting/blocking the power of the internal combustion engine selectively. In this case, the oil pressure for actuating the main clutch and the oil pressure for the transmission can be supplied from a single oil pressure source. As a result, the hydraulic unit can be small-sized.

In the present invention, moreover, the array of the internal combustion engine, the motor generator and the transmission can be selected to the most efficient one in the longitudinal direction of the vehicle, so that the drive system can also be well mounted.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 4 is a chart showing the control contents in a variety of running modes of a vehicle to which is applied the hybrid drive system of the first embodiment of the present invention;

FIG. 14 is a chart showing both the running mode examples of a vehicle using the hybrid drive system of the fifth embodiment of the present invention and the control content of the same;

DETAILED DESCRIPTION OF THE PREFERRED EMBODIMENTS

Figure 1:
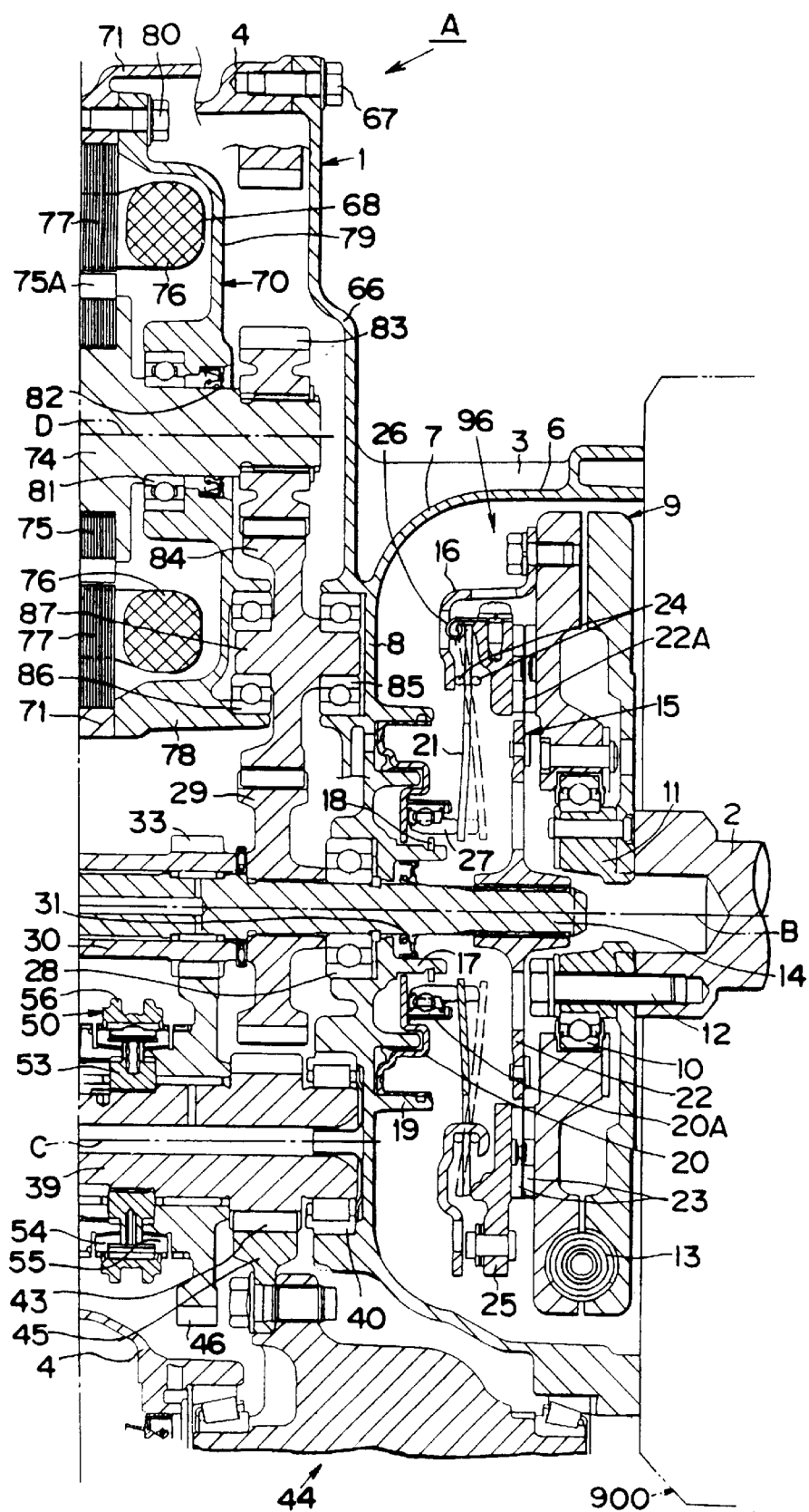
FIG. 1 is a section showing a construction of a substantial half of a hybrid drive system according to a first embodiment of the present invention.
Figure 2:
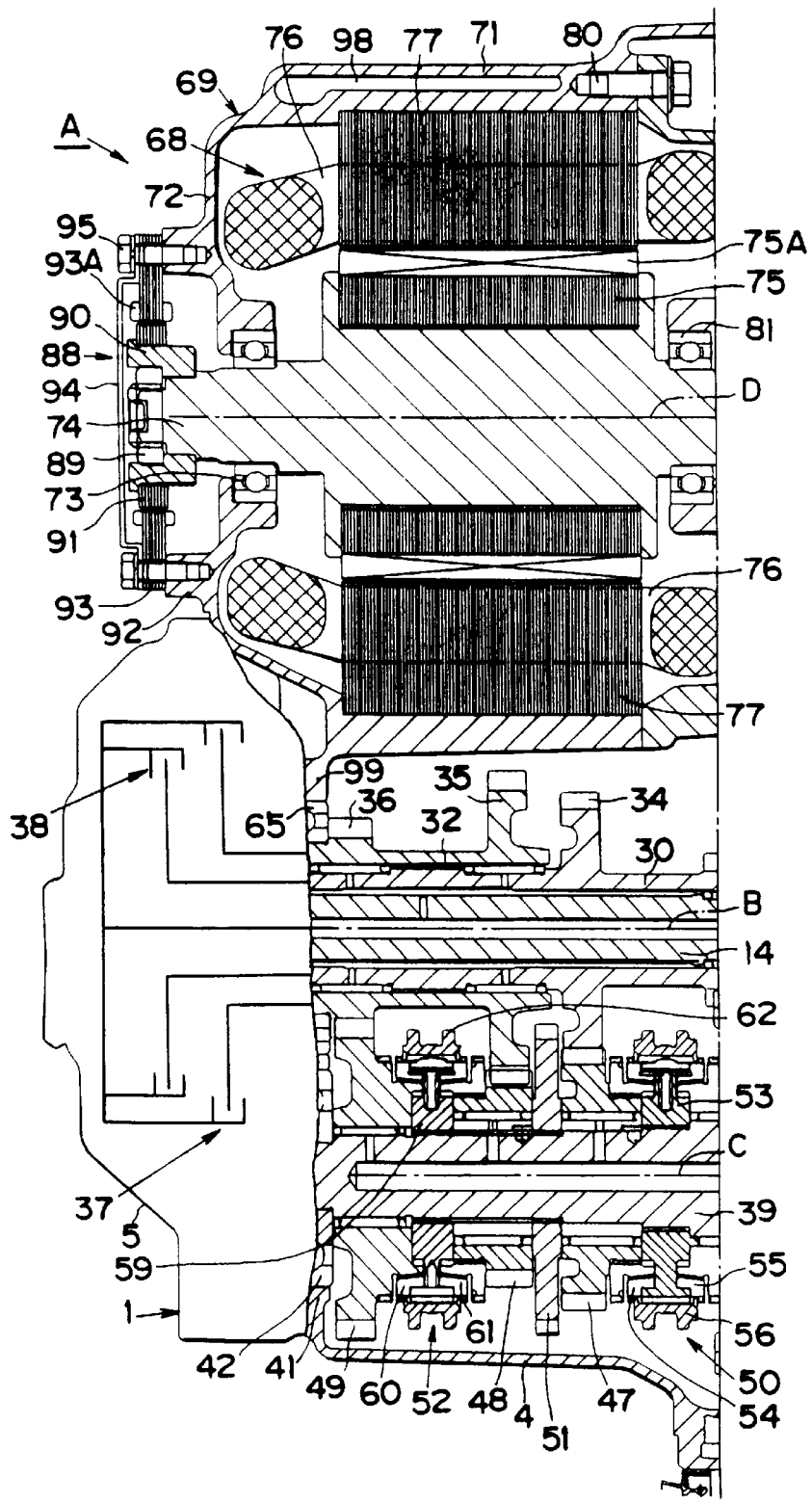
FIG. 2 is a section showing a construction of a substantial other half of the hybrid drive system according to the first embodiment of the present invention.

The present invention will be specifically described in the following with reference to the accompanying drawings. FIGS. 1 and 2 are sections showing a hybrid drive system according to a first embodiment by dividing it substantially into two halves. An internal combustion engine 900 is equipped with a crankshaft 2 oriented in an axial direction B. This crankshaft 2 corresponds to a drive shaft of the present invention. Incidentally, the internal combustion engine 900 is not equipped with a starting motor.

To one end portion of the internal combustion engine 900, there is attached a transmission A. This transmission A includes a hollow housing 1 which has a first case 3 abutting against the internal combustion engine 900 to act as a clutch housing. The housing 1 further includes a second case 4, as disposed in the first case 3 at the side opposite to the internal combustion engine 900, and a cover 5 closing the opening of the second case 4, as opposed to the first case 3.

The first case 3 is composed of: a cylindrical portion 6 disposed on the axis B; a curved portion 7 curved inward at one end side of the cylindrical portion, i.e., at the side of the second case 4 all over its circumference; and a partition portion 8 forming the inner circumference of the curved portion 7. Integrally with the curved portion 7, there is formed an bulging portion 66 which bulges outward generally at a right angle with respect to the axis B of the crankshaft 2. The bulging portion 66 is fastened and fixed at its end portion to the end face of the second case 4 by screws 67.

In the first case 3, there is arranged a main clutch 96 which has the following construction. On the end portion of the crankshaft 2, there is fixed a disc-shaped flywheel 9, the inner circumference of which is fixed on the outer race of a bearing 10. In the inner race of the bearing 10, there is fixed a joint ring 11, which is fastened and fixed together with the flywheel 9 on the crankshaft 2 by screws 12. Incidentally, the flywheel 9 is composed of two discs which are concentrically arranged to interpose a damper spring 13 inbetween.

On the side face of the flywheel 9 at the side of the partition portion 8, on the other hand, there is fixed an annular clutch cover 16. To the clutch cover 16, there is concentrically attached an annular diaphragm spring 21. This diaphragm spring 21 is so elastically supported on a wire ring 24 as to deform.

In the transmission A, on the other hand, an input shaft 14 is so arranged along the axis B from the first case 3 to the cover 5 that its one end reaches the inside of the joint ring 11. On the inner circumference of the partition portion 8, there is fixed a bearing 28 which supports the input shaft 14 rotatably.

To the input shaft 14, there is attached a clutch disc 15 which is arranged to confront the side face of the flywheel 9. This clutch disc 15 is composed of: a spline hub 22 splined to the input shaft 14; an annular cushion plate 22A fixed on the outer circumference of the spline hub 22; and a clutch facing 23 fixed on each of the side faces of the cushion plate 22A.

The clutch facings 23 are arranged between the flywheel 9 and the clutch cover 16, and one face of the clutch facing 23 facing to the partition portion 8 is confronted by an annular pressure plate 25. This pressure plate 25 is attached to the outer circumferential portion of the diaphragm spring 21 by joint members 26. The pressure plate 25 is urged toward the flywheel 9 by the elastic force of the diaphragm spring 21. Thus, the clutch disc 15 is clamped between the pressure plate 25 and the flywheel 9.

From the partition portion 8, there is protruded toward the flywheel 9 a cylindrical cylinder 19, in which is so fitted an annular piston 20 as to move in the direction of the axis B. This piston 20 has an annular plate portion extending toward the inner circumference, i.e., the center thereof. On the face of the plate portion, as confronting the diaphragm spring 21, there is mounted an annular release bearing 20A. The inner race of this release bearing 20A is protruded in the direction of the axis B to construct a piston rod 27. The leading end of this piston rod 27 is in abutment against the side face of the inner circumferential side of the diaphragm spring 21.

On the inner circumferential end of the partition portion 8, there is formed a cylindrical boss 17 which is protruded on the axis B toward the crankshaft 2. The external diameter of the boss 17 is set to a value smaller than the internal diameter of the plate. portion in the piston 20. On the outer circumference of the boss 17, there is fitted a snap ring 18 which determines the stroke end of the piston 20. In the inner circumference of the boss 17, on the other hand, there is fitted an oil seal 31 for keeping liquid-tightness between the boss 17 and the input shaft 14.

The main clutch 96 thus far described, is actuated by controlling the oil pressure coming from the not-shown oil pressure source. Specifically, when the working oil pressure of its source is weaker than the elastic force of the diaphragm spring 21, the piston 20 is stopped at the side of the partition portion 8, as shown in FIG. 1, so that the diaphragm spring 21 is stopped in the position of solid lines. This elastic force of the diaphragm spring 21 pushes the pressure plate 25 toward the flywheel 9. As a result, the clutch disc 15 is clamped between the pressure plate 25 and the flywheel 9 so that it is held in the torque transmitting state.

On the other hand, when the oil pressure of its source is applied to push the piston 20 toward the flywheel 9, the diaphragm spring 21 is released from the pushing force of the piston rod 27 to deform elastically, as shown by dotted lines. Then, the outer circumferential side of the diaphragm spring 21 moves the joint members 26 toward the partition portion 8 so that the pressure plate 25 retracts apart from the flywheel 9. As a result, the clutch disc 15 is released from its clamped state so that the torque of the crankshaft 2 is not transmitted to the input shaft 14.

To the aforementioned input shaft 14 at a position closer to the cover 5 than the bearing 28, there is splined a drive gear 29, which corresponds to the input member of the present invention. On the input shaft 14 at a outer circumferential position closer to the cover 5 than the drive gear 29, there is so fitted a pipe-shaped first gear shaft 30 as to allow relative rotations between the input shaft 14 and the first gear shaft 30. On the outer circumference of the first gear shaft 30, there is fitted a second gear shaft 32 which is smaller in the length in the direction of the axis B than the first gear shaft 30, such that the first gear shaft 30 and the second gear shaft 32 can rotate relatively each other. A drive gear 33 is formed on the outer circumference of the first gear shaft 30 at the side of the drive gear 29. On the other hand, a drive gear 34 is formed on the first gear shaft 30 at the side of the second gear shaft 32. The drive gear 34 is set to have a larger external diameter than that of the drive gear 33.

On the other hand, the second gear shaft 32 is equipped integrally with a drive gear 35 at the side of the drive gear 34 and with a drive gear 36 at the end portion thereof at the side of the cover 5. The drive gear 35 is set to have a larger external diameter than that of the drive gear 34. Moreover, the drive gear 36 is set to have an external diameter larger than that of the drive gear 33 but smaller than that of the drive gear 34.

The input shaft 14 is equipped with a first clutch mechanism 37 and a second clutch mechanism 38 which are made annular on its end portion at the side of the cover 5. These first and second clutch mechanisms 37 and 38 are set to have external diameters larger than that of the drive gear 35. Moreover, the input shaft 14 and the second gear shaft 32 are connected/disconnected by the first clutch mechanism 37, whereas the input shaft 14 and the first gear shaft 30 are connected/disconnected by the second clutch mechanism 38. Incidentally, the other end of the second gear shaft 32 is supported by a bearing 65 which is disposed in a position closer to the cover 5 than the drive gear 36.

In the second case 4, there is disposed an output shaft 39 on an axis C in parallel with the axis B. A bearing 40 is fixed on the side face of the partition portion 8 at the side of the second case 4. In the portion of the second case 4 closer to the cover 5, on the other hand, there is formed a frame 41 which is so bulged inward of the second case 4 as to support a bearing 42. The output shaft 39 is held at its one end side by the bearing 40 and at its other end side by the bearing 42. On the output shaft 39 in the vicinity of the bearing 40, there is formed a final gear 43. This final gear 43 corresponds to the output member of the present invention and meshes with a ring gear 45 of a differential 44, as disposed at the outer circumferential side of the transmission A.

On the other hand, the output shaft 39 is equipped on its outer circumference with a first driven gear 46, a second driven gear 47, a third driven gear 48 and a fourth driven gear 49, which are arranged at a predetermined interval from the side of the final gear 43 to the bearing 42. These first, second, third and fourth driven gears 46, 47, 48 and 49 are individually constructed to rotate with the output shaft 39 relatively to the output shaft 39. The first driven gear 46 meshes with the drive gear 33, and the second driven gear 47 meshes with the drive gear 34. The third driven gear 48 meshes with the drive gear 35, and the fourth driven gear 49 meshes with the drive gear 36.

The fourth driven gear 49 is set to have an external diameter smaller than that of the first driven gear 46, and the second driven gear 47 is set to have an external diameter smaller than that of the fourth drive gear 49. The third driven gear 48 is set to have an external diameter smaller than that of the second driven gear 47.

A first synchronizer (or a synchronous meshing mechanism) 50 is interposed between the first driven gear 46 and the second driven gear 47 on the outer circumference of the output shaft 39. A parking gear 51 is splined to the outer circumference of the output shaft 39 between the second driven gear 47 and the third driven gear 48. A second synchronizer 52 is interposed between the third driven gear 48 and the fourth driven gear 49 on the outer circumference of the output shaft 39.

The first synchronizer 50 is given the known structure which is composed of: an annular clutch hub 53 splined to the output shaft 39; synchronizer rings 54 and 55 mounted on the two sides of the clutch hub 53; and an annular sleeve 56 mounted on the outer circumference of the clutch hub 53. Moreover, as the sleeve 56 is moved in the direction of axis C by the not-shown selector or shift fork, either the first driven gear 46 or the second driven gear 47 is connected to the output shaft 39.

The second synchronizer 52 is given the known structure which is composed of: an annular clutch hub 59 splined to the output shaft 39; synchronizer rings 60 and 61 mounted on the two sides of the clutch hub 59; and an annular sleeve 62 mounted on the outer circumference of the clutch hub 59. Moreover, as the sleeve 62 is moved in the direction of the axis C by the not-shown selector or shift fork, either the third driven gear 48 or the fourth driven gear 49 is connected to the output shaft 39. Incidentally, the selector or the shift fork can be driven by the not-shown actuator.

Below the transmission A, on the other hand, there is arranged the not-shown oil pan. This oil pan contains the oil which is fed by a hydraulic unit to lubricate or cool the inside of the transmission A.

In a position facing the inside of the second case 4, on the other hand, there is disposed a hollow motor case 69, in which is disposed a motor generator 68. This motor generator 68 is connected through the cable and the inverter with the battery which is mounted in the engine room of the vehicle. The motor generator 68 has a power function to transform the electric energy of the battery into a mechanical energy thereby to output the mechanical energy to the outside. The motor generator 68 further has a regenerative function to transform the mechanical energy of the outside such as the torque of the crankshaft 2 or the rotations of the wheels into an electric energy thereby to charge the battery with the electric energy.

The motor case 69 is composed of a cylindrical portion 71 around an axis D generally in parallel with the axis B, and a side wall portion 72 integrated with the end portion of the cylindrical portion 71 at the side of the cover 5. A substantial half of the cylindrical portion 71 is arranged to face the inside of the housing 1, and the remaining half is exposed to the outside of the housing 1.

In the portion of the cylindrical portion 71, as facing the inside of the housing 1, there is formed an extending portion 99 which is protruded toward the cover 5. The bearing 65 is retained by the extending portion 99 and the frame 41. Incidentally, the cylindrical portion 71 is equipped with a cooling jacket 98, which is fed with the cooling water so that it can cool the motor generator 68 indirectly.

The motor generator 68 is composed of an annular rotor 75 fixed on the outer circumference of a motor shaft 74 arranged along the axis D, and a stator 77 arranged around the rotor 75. A plurality of magnets 75A are embedded in the outer circumferential portion of the rotor 75, whereas a coil 76 is wound on the stator 77. Moreover, a small clearance is left between the confronting faces of the rotor 75 and the stator 77. In the inner circumference of the side wall portion 72; on the other hand, there is fixed a bearing 73, which retains one end side of the motor 74.

On the other hand, the opening of the motor case 69 in the housing 1 is closed by a cover portion 70. This cover portion 70 is composed of a cylindrical portion 78 centering the axis D, and an end face portion 79 forming one end of the cylindrical portion 78, so that the cover portion 70 is fixed by fastening screws 80 on the open end of the cylindrical portion 71 with the outer circumference of the cylindrical portion 78. Between the cylindrical portion 78 and the cylindrical portion 71, moreover, there is sandwiched the not-shown annular gasket which keeps the cylindrical portions 78 and 71 liquid-tight.

In the inner circumference of the end face portion 79, moreover, there is fixed a bearing 81 which rotatably supports the other end side of the motor shaft 74. In the position of the inner circumference of the end face portion 79, as located closer to the bulging portion 66 than the bearing 81, on the other hand, there is fixed an oil seal 82 which keeps the motor shaft 74 and the end face portion 79 liquid-tight. In the motor generator 68 thus constructed, a magnetic field is generated between the rotor 75 and the stator 77 by the energization from the battery so that the motor shaft 74 is rotated.

On the other hand, the other end of the motor shaft 74 is extended through the cover portion 70 into the second case 4 to mount a gear 83 on the leading end portion. Between the partition portion 8 and the cover portion 70 of the first case 3, moreover, there is interposed an idle gear 84. The gear 83 and the idle gear 84 correspond to the transmission mechanism of the present invention. The idle gear 84 meshes with the gear 83 and the drive gear 29. A bearing 85 is fixed on the side face of the partition portion 8 at the side of the second case 4, and a bearing 86 is fixed on the face, as opposed to the partition portion 8, of the cover portion 70. Moreover, the gear shaft 87 of the idle gear 84 is supported by those bearings 85 and 86.

Outside of the motor case 69, moreover, there is disposed a resolver 88. This resolver 88 is provided for detecting the angle of rotation of the motor generator 68. The resolver 88 is composed of: a ring 90 fixed on the end portion of the motor shaft 74 by nuts 89; an annular rotor 91 fixed on the outer circumference of the ring 90; and a stator 93 fixed on a mount 92 protruded from the outer surface of the flange 72. The stator 93 is fixed together with a cover 94 on the mount 92 by fastening screws 95. A coil 93A is wound on the stator 93.

Figure 3:
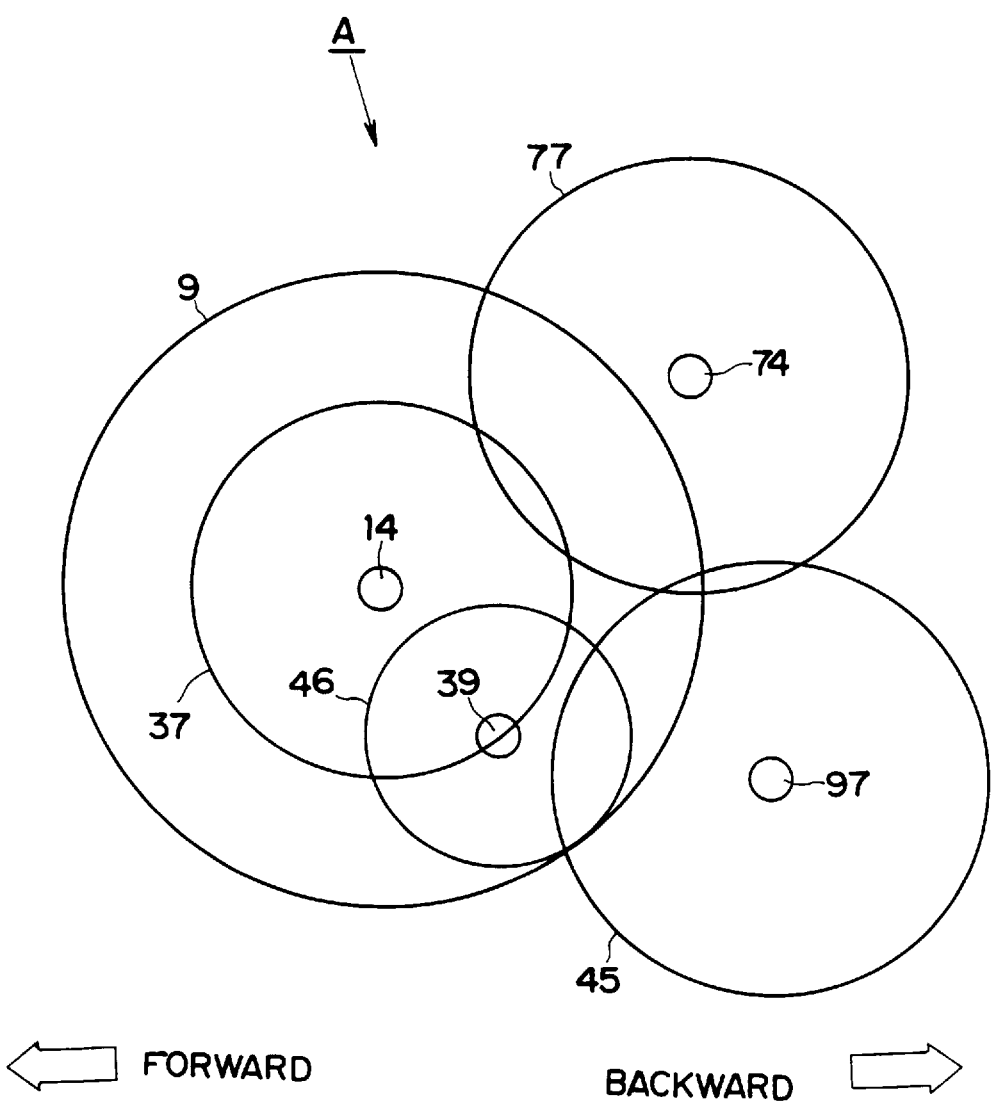
FIG. 3 is an arrangement plan of an input shaft, a motor shaft, an output shaft and a drive shaft of the hybrid drive system of the first embodiment of the present invention, as viewed from the shaft end side.

FIG. 3 is an arrangement plan of the input shaft 14, the output shaft 39, the motor shaft 74 and so on, as viewed from their axial end side. In the first embodiment, there is adopted the transverse arrangement in which the individual axes B, D and C are perpendicular to the not-shown longitudinal direction of the vehicle. Of the individual shafts, moreover, the input shaft 14 is arranged in the foremost position of the vehicle, and the output shaft 39 and the motor shaft 74 are arranged at the back of the input shaft 14. Incidentally, reference numeral 97 designates a drive shaft of the differential 44.

Next, an example of the running modes of the vehicle employing the hybrid drive system of the first embodiment will be described with reference to FIG. 4. In FIG. 4, symbols O indicate the applied state, in which the torque is transmitted, and blanks indicate the released state, in which the torque is not transmitted. In Mode 1, only the internal combustion engine 900 is used as the power source; in Mode 2, only the motor generator 68 is used as the power source; and in Mode 3, both the internal combustion engine 900 and the motor generator 68 are used as the power source. In Mode 1, moreover, the forward stages are exclusively achieved.

First of all, before the internal combustion engine 900 is started, no oil pressure is produced so that the main clutch 96 is applied whereas the first clutch mechanism 37 and the second clutch mechanism 38 are released. When the motor generator 68 is operated before the run of the vehicle, its torque is transmitted through the input shaft 14 to the crankshaft 2 to start the internal combustion engine 900. This makes the present invention require no starting motor.

When the first speed of Mode 1 is selected, the main clutch 96 and the second clutch mechanism 38 are applied, and the output shaft 39 and the first driven gear 46 are connected by the action of the first synchronizer 50. As a result, the power of the internal combustion engine 900 is decelerated and transmitted through the crankshaft 2, the input shaft 14, the first gear shaft 30, the drive gear 33 and the first driven gear 46 to the output shaft 39 and then to the differential 44.

When the second forward speed is selected, on the other hand, the main clutch 96 and the first clutch mechanism 37 are applied, and the output shaft 39 and the fourth driven gear 49 are connected by the action of the second synchronizer 52. As a result, the power of the internal combustion engine 900 is decelerated and transmitted through the crankshaft 2, the input shaft 14, the second gear shaft 32, the drive gear 36 and the fourth driven gear 49 to the output shaft 39 and then to the differential 44.

When the third forward speed is selected, furthermore, the main clutch 96 and the second clutch mechanism 38 are applied, and the output shaft 39 and the second driven gear 47 are connected by the action of the first synchronizer 50. As a result, the torque of the internal combustion engine 900 is transmitted through the crankshaft 2, the input shaft 14, the first gear shaft 30, the drive gear 34 and the second driven gear 47 to the output shaft 39 and then to the differential 44.

When the fourth forward speed is selected, furthermore, the main clutch 96 and the first clutch mechanism 37 are connected, and the output shaft 39 and the third driven gear 48 are connected by the action of the second synchronizer 52. As a result, the torque of the internal combustion engine 900 is accelerated and transmitted through the crankshaft 2, the input shaft 14, the second gear shaft 32, the drive gear 35 and the third driven gear 48 to the output shaft 39 and then to the differential 44.

In the control of Mode 2, the piston 20 is actuated rightward of FIG. 1 by the oil pressure to release the main clutch 96. When the reverse stage (R) is selected in Mode 2, the second clutch mechanism 38 is applied, and the output shaft 39 and the first driven gear 46 are connected by the action of the first synchronizer 50. As a result, the motor shaft 74 is rotated by energizing the motor generator 68 so that its power is transmitted through the gear 83, the idle gear 84, the input shaft 14, the first gear shaft 30, the drive gear 33 and the first driven gear 46 to the output shaft 39 and then to the differential 44. In this case, it is quite natural that the rotational direction of the motor shaft 74 is reversed from that for starting the internal combustion engine 900 so that the rotational direction of the output shaft 39 is reversed from that of the forward stages.

When the first forward speed in Mode 2 is selected, the second clutch mechanism 38 is applied, and the output shaft 39 and the first driven gear 46 are connected by the action of the first synchronizer 50. Then, the motor generator 68 is rotated in the direction opposite to that at the reverse stage so that its power is decelerated and transmitted through the idle gear 84, the input shaft 14, the first gear shaft 30, the drive gear 33 and the first driven gear 46 to the output shaft 39 and further to the differential 44.

When the second forward speed in Mode 2 is selected, the first clutch mechanism 37 is applied, and the output shaft 39 and the fourth driven gear 49 are connected by the action of the second synchronizer 52. As a result, the power of the motor generator 68 is decelerated and transmitted through the idle gear 84, the input shaft 14, the second gear shaft 32, the drive gear 36 and the fourth driven gear 49 to the output shaft 39 and further to the differential 44.

When the third forward speed in Mode 2 is selected, the second clutch mechanism 38 is applied, and the output shaft 39 and the second driven gear 47 are connected by the action of the first synchronizer 50. As a result, the power of the motor generator 68 is transmitted through the idle gear 84, the input shaft 14, the first gear shaft 30, the drive gear 34 and the second driven gear 47 to the output shaft 39 and further to the differential 44.

When the fourth forward speed in Mode 2 is selected, furthermore, the first clutch mechanism 37 is applied, and the output shaft 39 and the third driven gear 48 are connected by the action of the second synchronizer 52. As a result, the torque of the motor generator 68 is accelerated and transmitted through the idle gear 84, the input shaft 14, the second gear shaft 32, the drive gear 35 and the third driven gear 48 to the output shaft 39 and further to the differential 44.

When the parking range (P) or the neutral range (N) is selected in Mode 3, on the other hand, only the main clutch 96 is applied so that the motor generator 68 is rotated to act as a generator. The electric power thus generated is stored in the battery. In short, the regeneration is executed. The stored electric power acts as the power source when the motor generator 68 and the internal combustion engine 900 are used together and when the motor generator 68 is solely used.

In the parking range, however, the parking gear 51 and a rotation regulating member, as provided in the transmission A, such as the not-shown parking lock pole come into meshing engagement to lock the output shaft 39 thereby to retaining the stop state of the vehicle. In this Mode 3, the active states of the individual clutches and synchronizers for the first to fourth forward speeds are identical to those at the first to fourth forward speeds in Mode 1, but what is different resides in that the power of the internal combustion engine 900 and the power of the motor generator 68 are used together.

In the hybrid drive system of the first embodiment thus far described, the transmission A and the motor generator 68 are arranged in parallel in such positions that the input shaft 14, the output shaft 39 and the motor shaft 74 are in parallel with one another. As a result, the total length, as taken by the internal combustion engine 900, the transmission A and the motor generator 68 in the directions of the individual axes B, C and D of the hybrid drive system, can be suppressed to shorten the total length of the system. Thus, there are achieved effects that the mountability of the vehicle and the arrangement of the peripheral devices is less restricted, and that the floor of the vehicle can be flattened to improve the compartment accommodation.

In the first embodiment, moreover, the drive gear 29, the gear 83, the idle gear 84 and the final gear 43 are arranged at the same position, as taken in the direction of the individual axes B, C and D. As a result, the area for arranging the individual gears in the direction of the individual axes B, C and D is narrowed to further shorten the total length of the hybrid drive system in the axial direction.

In the first embodiment, moreover, the motor case 69 is kept liquid-tight by the oil seal 82 and the not-shown gasket so that the oil in the housing 1 is kept away from the inside of the motor case 69. As a result, the strength of the magnetic field to be established in the small clearance between the rotor 75 and the stator 77 is maintained. Moreover, the motor shaft 74 has no drive loss so that it can achieve stable power characteristics for a long time period.

In the first embodiment, moreover, the motor case 69, as accommodating the motor generator 68, is arranged in the spaces, as formed between the first clutch mechanism 37 and the second clutch mechanism 38 and between the gear 83 and the idle gear 84. Therefore, the motor generator 68 can be brought as close to the input shaft 14 as possible. As a result, the inter-axis distance between the input shaft 14 and the motor shaft 74 is shortened to reduce the total size of the hybrid drive system in the direction perpendicular to the axial direction, too.

Figure 5:
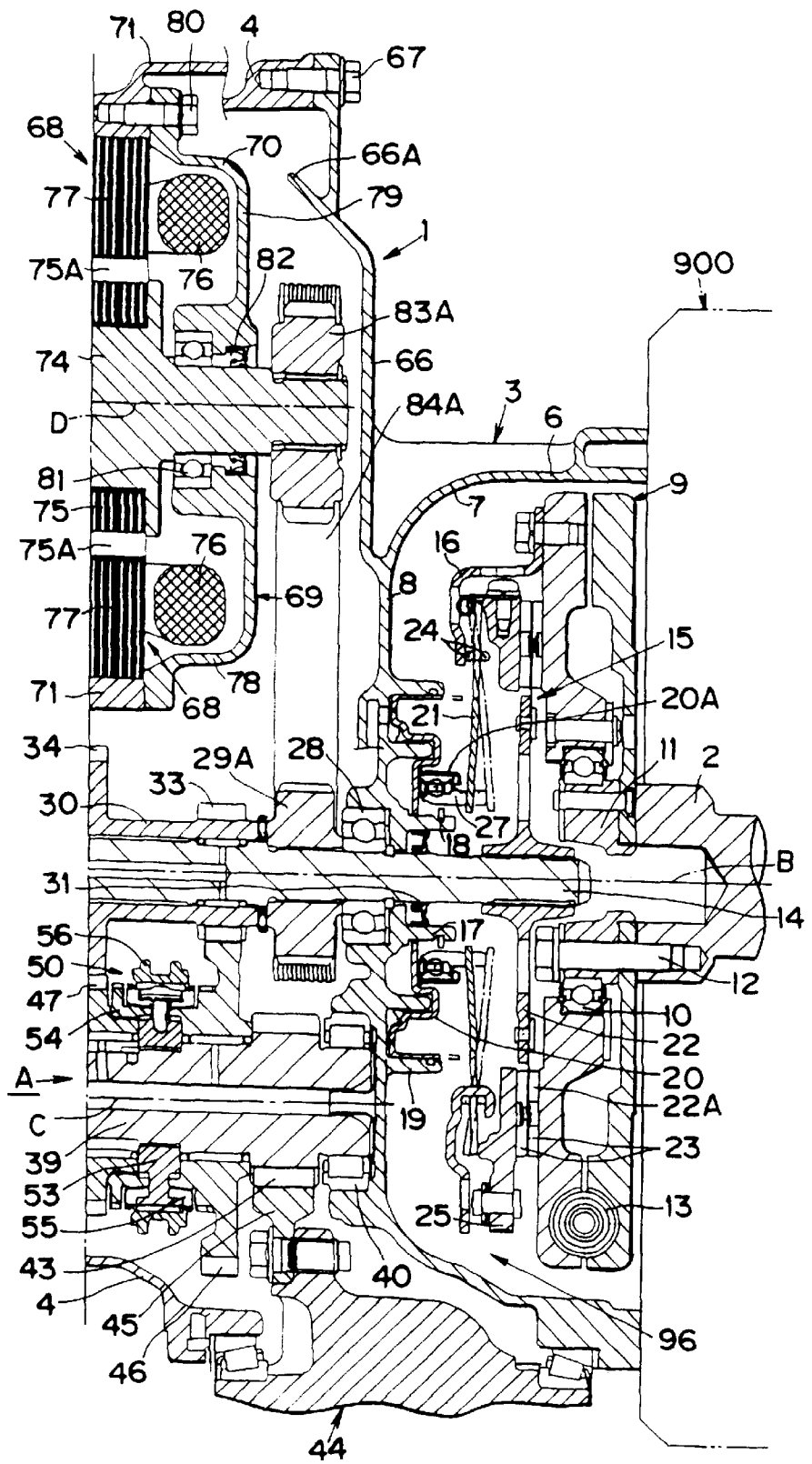
FIG. 5 is a section showing a construction of a substantial half of a hybrid drive system according to a second embodiment of the present invention.

FIG. 5 is a section showing a construction of a substantial half of a hybrid drive system of a second embodiment at the side of the internal combustion engine 900. In this embodiment, there is interposed between the bearing 28 of the input shaft 14 and the first gear shaft 30 a sprocket 29A, which corresponds to the input member of the present invention.

To the end portion of the motor shaft 74 at the side of the second case 4, on the other hand, there is attached a sprocket 83A, which corresponds to the input member or the transmission mechanism of the present invention. Between the sprocket 29A and the sprocket 83A, moreover, there is tensed a silent chain 84A, which corresponds to the input member or the transmission mechanism, or the rotary member of the present invention.

On the inner face of the bulging portion 66 in the vicinity of the sprocket 83A, moreover, there are formed ribs 66A which are inclined toward the screws 80. These ribs 66A correspond to the guide member of the present invention. The present invention does not have the constructions corresponding to the drive gear 29, the gear 83, the idle gear 84 and the bearings 85 and 86 of the first embodiment but is identical to the remaining constructions of the first embodiment.

The second embodiment is different from the first embodiment in that the torque transmission between the input shaft 14 and the motor shaft 74 is effected by the rotations of the sprockets 29A and 83A and the circulating run of the chain 84A. The remaining torque transmissions and the control contents in the individual running modes, when applied to the vehicle, are similar to those of the first embodiment.

From the second embodiment described above, too, there can be achieved effects similar to those of the first embodiment. In the second embodiment, moreover, the sprocket 29A, the sprocket 83A, the silent chain 84A and the final gear 43 are arranged in the same position, as taken in the direction of the individual axes B, C and D. As a result, the area for arranging the individual members in the direction of the individual axes is narrowed to further shorten the area for arranging the hybrid drive system in the axial direction.

In the second embodiment, moreover, the motor case 69 accommodating the motor generator 68 is arranged in the spaces which are formed between the first clutch mechanism 37 and the second clutch mechanism 38 and between the sprocket 83A and the silent chain 84A. As a result, the motor generator 68 can be brought as close to the input shaft 14 as possible. Moreover, there can be achieved the effect that the inter-axis distance between the input shaft 14 and the motor shaft 74 is shortened so that the area for arranging the hybrid drive system as a whole in the direction perpendicular to the axial direction is narrowed.

In the second embodiment, moreover, when the chain 84A is circulated to run, the oil in the transmission A is splashed by the chain 84A and fed to the motor generator 68 to suppress the temperature rise in the motor generator 68. As a result, there is achieved an effect that the driving efficiency of the motor generator 68 can be kept at a satisfactory level for a long time period. Incidentally, the splashed oil is directed along the shape of the ribs 66A toward the cover portion 70 so that it is accurately fed toward the cover portion 70 to further improve the temperature suppressing function.

Figure 6:
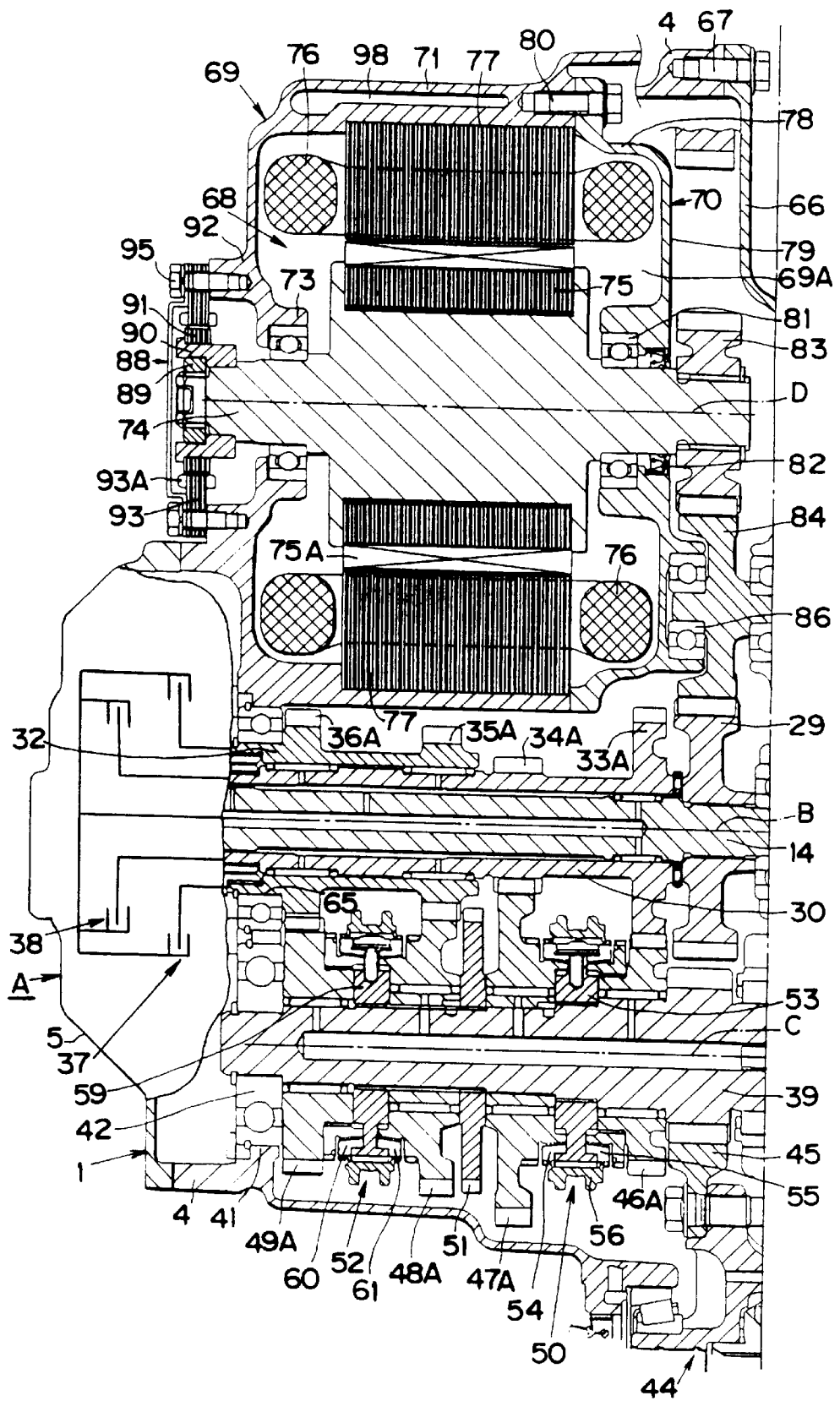
FIG. 6 is a section showing a construction of a substantial half of a hybrid drive system according to a third embodiment of the present invention.

FIG. 6 is a section showing a construction of a substantial half of a hybrid drive system according to a third embodiment. The first gear shaft 30, as disposed around the outer circumference of the input shaft 14, is equipped integrally with drive gears 33A and 34A of different external diameters along the direction of the axis B. On the other hand, the second gear shaft 32, as disposed around the outer circumference of the first gear shaft 30, is equipped with drive gears 35A and 36A of different external diameters along the axial direction B.

Of these drive gears 33A, 34A, 35A and 36A, the drive gear 33A is set to have the largest external diameter, whereas the drive gear 34A is set to have the smallest external diameter. The drive gear 36A is set to have an external diameter smaller than that of the drive gear 33A but larger than that of the drive gear 35A. The drive gear 35A is set to have an external diameter larger than that of the drive gear 34A.

Moreover, the higher rank two gears having the larger external diameters, i.e., the drive gear 33A and the drive gear 36A are arranged at the two ends in the axial direction B, and the drive gears 34A and 35A are arranged between the drive gear 33A and the drive gear 36A. This arrangement can retain between the drive gear 33A and the drive gear 36A a radial space for arranging a portion of the motor case 69 accommodating the motor generator 68 therein.

On the output shaft 39, on the other hand, there are arrayed in the axial direction C: a first driven gear 46A meshing with the drive gear 33A; a second driven gear 47A meshing with the drive gear 34A; a third drive gear 48A meshing with the drive gear 35A; and a fourth driven gear 49A meshing with the drive gear 36A. The second driven gear 47A is set to have the largest external diameter whereas the first driven gear 46A is set to have the smallest external diameter. The third driven gear 48A is set to have an external diameter smaller than that of the second driven gear 47A but larger than that of the fourth driven gear 49A. The remaining constructions are similar to those of the first embodiment.

Here will be described the running modes of the vehicle to which is applied the third embodiment. When the first speed of the forward stages is selected, the second clutch mechanism 38 is applied, and the second driven gear 47A and the output shaft 39 are connected by the first synchronizer 50 to transmit the torque. When the second speed of the forward stages is selected, on the other hand, the first clutch mechanism 37 is applied, and the third drive gear 48A and the output shaft 39 are connected by the second synchronizer 52 to transmit the torque. When the third speed of the forward stages is selected, furthermore, the first clutch mechanism 37 is applied, and the fourth driven gear 49A and the output shaft 39 are connected by the second synchronizer 52 to transmit the torque. When the fourth speed of the forward stages is selected, furthermore, the second clutch mechanism 38 is applied, and the first driven gear 46A and the output shaft 39 are connected by the first synchronizer 50 to transmit the torque. These control contents are applied to both the case, in which either the internal combustion engine 900 or the motor generator 68 is used, and the case in which the internal combustion engine 900 and the motor generator 68 are used together.

By the hybrid drive system of the third embodiment described above, there are also achieved effects similar to those of the first embodiment. In the third embodiment, moreover, the higher rank two drive gears 33A and 36A having the larger external diameters are arranged at the two ends of the axial direction B. This arrangement forms between the drive gears 33A and 36A the radial space which can accommodate a portion of the motor case 69. As a result, the transmission A and the motor generator 68 can be arranged closer to each other to further shorten the inter-axis distance between the input shaft 14 and the motor shaft 74.

Figure 7:
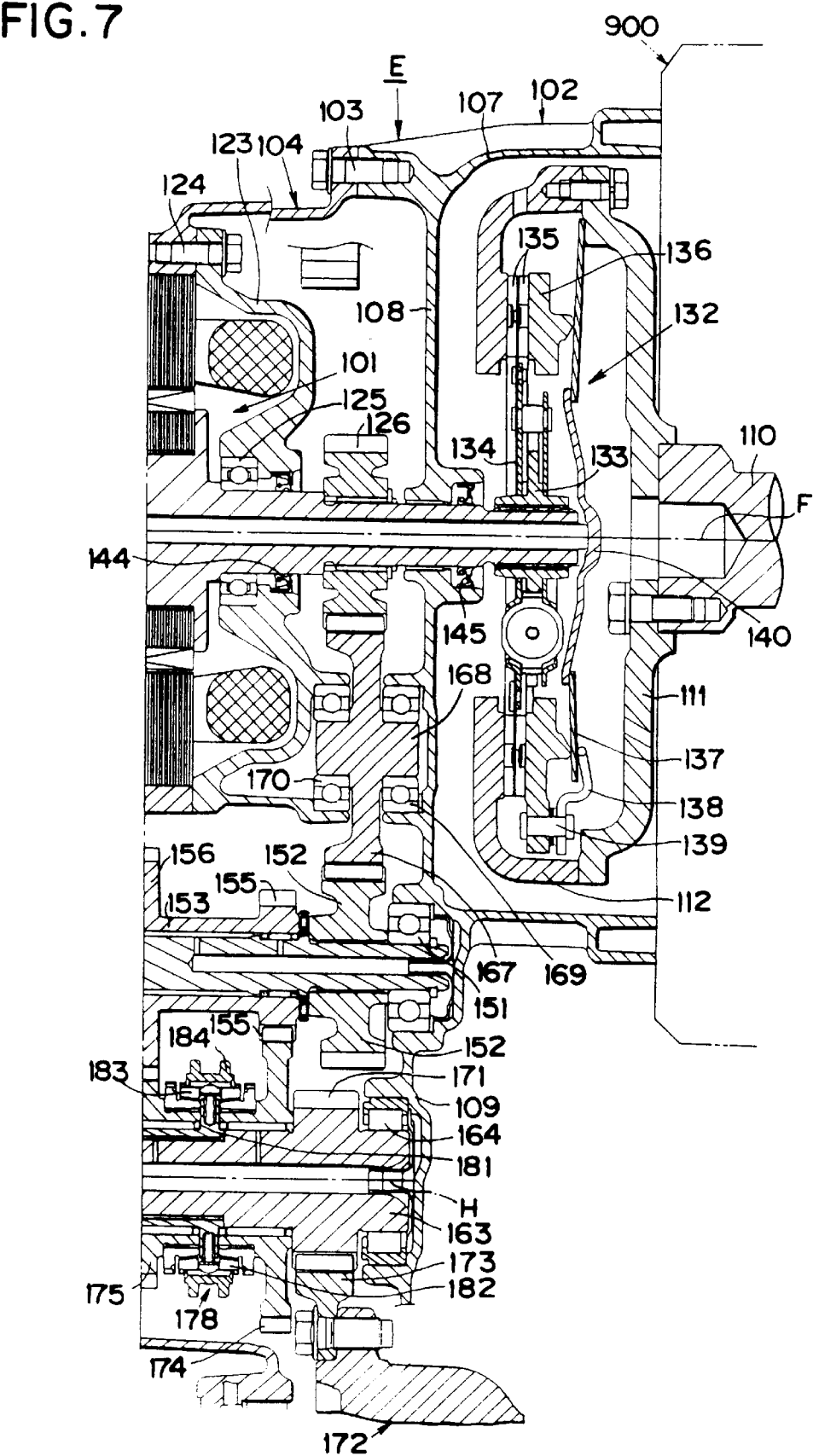
FIG. 7 is a section showing a construction of a substantial half of a hybrid drive system according to a fourth embodiment of the present invention.
Figure 8:
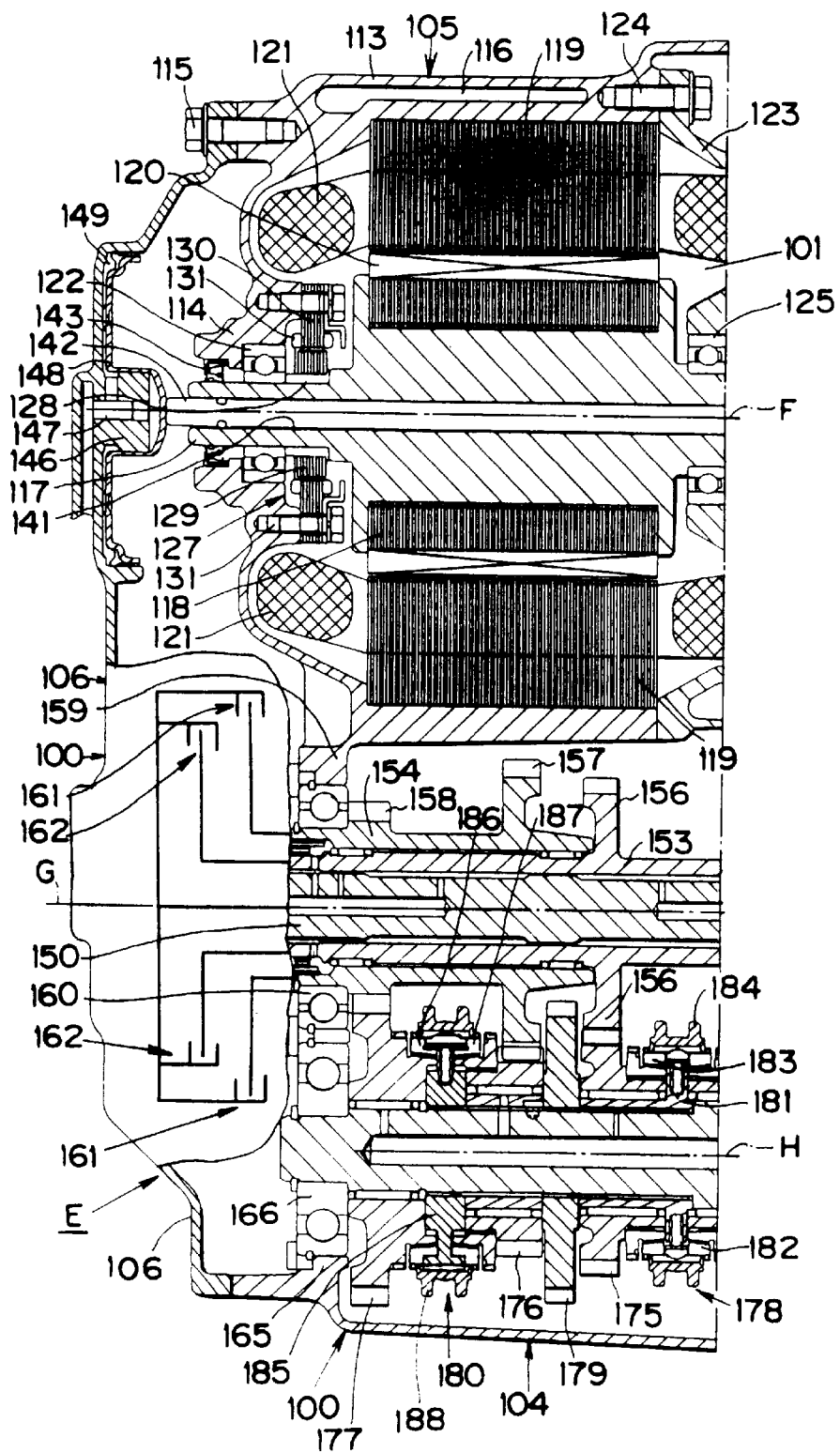
FIG. 8 is a section showing a construction of a substantial other half of the hybrid drive system according to the fourth embodiment of the present invention.

FIGS. 7 and 8 are sections showing a hybrid drive system of a fourth embodiment in a divided manner. The hybrid drive system, as shown, is equipped with a transmission E disposed at the back of the internal combustion engine 900, and a motor generator 101 arranged in parallel with the transmission E. This transmission E includes a hollow housing 100, which has a first case 102 or the clutch housing abutting against the internal combustion engine 900. The housing 100 further has a second case 104 fixed on the first case 102 by screws 103, and a cover 106 fixed on the opening of the second case 104.

The first case 102 is composed of a cylindrical portion 107 centering an axis F, and a partition portion 108 disposed in the inner circumference of the cylindrical portion 107. With the first case 102, there is integrally formed a bulging portion 109 which is bulged radially outward generally at a right angle with respect to the axis F.

A crankshaft 110 or the drive shaft of the internal combustion engine 900 is aligned with the axis F, and a disc-shaped flywheel 111 is fixed on the crankshaft 110. The flywheel 111 is arranged in the first case 102, and an annular member 112 is fixed on the side face of the flywheel 111 at the side of the partition 108.

In the second case 104, there is disposed a motor case 105 accommodating the motor generator 101. This motor case 105 is composed of a cylindrical portion 113 centering the axis F, and an end face portion 114 formed in the cylindrical portion 113 at the inner circumferential end at the side of the cover 106. The cylindrical portion 113 and the cover 106 are fixed by fastening screws 115. The cylindrical portion 113 is equipped with a cooling jacket 116 which is fed with cooling water so that it can cool the motor generator 101 indirectly.

The motor generator 101 is composed of an annular rotor 118 fixed on the outer. circumference of a motor shaft 117 arranged along the axis F, and a stator 119 arranged around the rotor 118. A magnetic coil 120 is mounted in the outer circumferential portion of the rotor 118, and a coil 121 is wound on the stator 119. A small clearance is formed between the confronting faces of the rotor 118 and the stator 119. In the inner circumference of the end face portion 114, there is fixed a bearing 122 which supports one end side of the motor shaft 117. On the inner circumference of the end face portion 114, there is fixed an oil seal 143 which keeps the end face portion 114 and the motor shaft 117 light-tight.

In the motor case 105 in the vicinity of the end face portion 114, on the other hand, there is disposed a resolver 127. This resolver 127 is provided for detecting the angle of rotation of the motor generator 101. The resolver 127 is composed of a ring 128 fixed on the motor shaft 117 an annular rotor 129 fixed on the outer circumference of the ring 128, and a stator 130 fixed in the inner face of the end face portion 114. The stator 130 is fixed on the flange 114 by screws 131. A coil 131 is wound on the stator 130.

The end portion of the motor case 105 at the side of the partition portion 108 is closed by an annular cover portion 123. The outer circumference of the cover portion 123 is fixed on the end face of the cylindrical portion 113 by fastening screws 124, and the motor shaft 117 is held generally at its center by a bearing 125 fitted in the inner circumference of the cover portion 123. Between the cylindrical portion 113 and the cover portion 123, there is sandwiched the not-shown annular gasket which keeps the cylindrical portion 113 and the cover portion 123 liquid-tight. In the inner circumference of the cover portion 123, on the other hand, there is fixed an oil seal 144 which keeps the cover portion 123 and the motor shaft 117 liquid-tight.

The aforementioned motor shaft 117 extends through the cover portion 123 and the partition portion 108 into the first case 102. On the motor shaft 117 between the partition portion 108 and the cover portion 123, there is fitted a gear 126, which corresponds to the input member or the transmission mechanism of the present invention. On the end portion of the motor shaft 117 at the side of the motor case 102, on the other hand, there is mounted a main clutch 132.

This main clutch 132 is composed of: a clutch hub 133 splined to the outer circumference of the motor shaft 117; an annular cushion plate 134 fixed on the outer circumference of the clutch hub 133; and a clutch facing 135 fixed on each of the two side faces of the cushion plate 134.

On the other hand, the main clutch 132 is composed of an annular pressure plate 136 arranged to confront the side face of the clutch facing 135 at the side of the flywheel 111, and a diaphragm spring 137 for pushing the pressure plate 136 toward the annular member 112. The diaphragm spring 137 is held in abutment against the pressure plate 136 by a wire ring 138, which in turn is fixed on the pressure plate 136 by a pin 139. A disc-shaped push plate 140 is interposed between the diaphragm spring 137 and the clutch hub 133. On the inner circumference of the partition portion 108, there is fixed an oil seal 145 which keeps the partition portion 108 and the motor shaft 117 liquid-tight.

In the motor shaft 117, there is formed an axial bore 141 which extends therethrough along the axis F. A release shaft 142 is so fitted in the axial bore 141 as to move along the axis F. On the axis F in the inner face of the cover 106, there is provided a cylindrical guide portion 146 which is protruded toward the motor shaft 117 and has an oil passage 147.

On the other hand, the guide portion 146 is equipped with a piston 148 which is molded in a bent shape to move in the direction of the axis F. This piston 148 is composed of a disc-shaped outer circumferential portion, and a bottomed cylindrical inner circumferential portion formed integrally with the inner circumference of the outer circumferential portion. The inner circumferential portion is fitted on the outer circumference of the guide portion 146. A pressure chamber 149 is formed liquid-tightly between the outer circumferential portion of the piston 148 and the cover 106 and the oil passage 147 is communicated to the pressure chamber 149. Incidentally, this oil passage 147 in turn communicates with the not-shown hydraulic device.

In the main clutch 132 thus constructed, when the oil pressure in the pressure chamber 149 is weaker than the elastic force of the diaphragm spring 137, this elastic force pushes the pressure plate 136 toward the annular member 112. Then, the clutch facing 135 is clamped to engage with the pressure plate 136 and the annular member 112. As a result, the torque of the crankshaft 110 is transmitted to the motor shaft 117.

When the pressure of the pressure chamber 149 exceeds the elastic force of the diaphragm spring 137, on the other hand, the piston 148 moves toward the motor shaft 117 to push the release shaft 142 rightward of FIGS. 7 and 8. As a result, this pushing force is applied through the push plate 140 to the diaphragm spring 137 so that this spring 137 elastically deforms on the abutment against the flywheel 111. Then, the pressure plate 136 is moved toward the crankshaft 110 by the diaphragm spring 137. As a result, the clutch facing 135 is released from between the pressure plate 136 and the annular member 112 so that the torque of the crankshaft is not transmitted to the motor shaft 117.

In the second case 104, there is disposed an input shaft 150 which extends along an axis G in parallel with the axis F. One end side of the input shaft 150 is supported by a bearing 151 which is mounted in the inner face of the bulging portion 109, but the other end side of the same extends as far as the vicinity of the cover 106.

A drive gear 152 is splined to the input shaft 150 at the side of the bearing 151, and a first gear shaft 153 of a pipe shape is fitted on the input shaft 150 at the side of the drive gear 152. Incidentally, the drive gear 152 and the gear 126 mesh with an idle gear 167. The drive gear 152 corresponds to a portion of the input member or the transmission mechanism of the present invention, and the idle gear 167 corresponds to the transmission mechanism of the present invention. A gear shaft 168 of the idle gear 167 is supported by both a bearing 169 fixed on the partition portion 108 and a bearing 170 fixed on the cover portion 123. The idle gear 167 and the drive gear 152 are arranged at the same position in the axial direction as the gear 126.

The input shaft 150 and the first gear shaft 153 are made rotatable relatively each other. On the outer circumference of the first gear shaft 153, there is fitted a second gear shaft 154 which is shorter in the direction of the axial direction G than the first gear shaft 153. The first gear shaft 153 and the second gear shaft 154 are made rotatable relatively each other. A drive gear 155 is formed on the outer circumference of the first gear shaft 153 at the side of the drive gear 152. A drive gear 156 is formed on the first gear shaft 153 at the side of the second gear shaft 154. The drive gear 156 is set to have an external diameter than that of the drive gear 155.

Moreover, a drive gear 157 is formed on the second gear shaft 154 at the side of the drive gear 156, and a drive gear 158 is formed on the second gear shaft 154 at the side of the cover 106. The drive gear 157 is set to have an external diameter larger than that of the drive gear 156. Moreover, the drive gear 158 is set to have an external diameter larger than that of the drive gear 155 but smaller than that of the drive gear 156. Incidentally, a bulging portion 159 is formed integrally with the cylindrical portion 113 of the aforementioned case 105 at the side of the second gear shaft 154, so that the second gear shaft 154 is supported by a bearing 160 fixed on the bulging portion 159.

At the input shaft 150 in the vicinity of the cover 106, there are disposed a first clutch mechanism 161 and a second clutch mechanism 162 which are made annular on the axis G. These first and second clutch mechanisms 161 and 162 are set to have larger diameters than that of the drive gear 157. Thus, the input shaft 150 and the second gear shaft 154 are connected/disconnected by the first clutch mechanism 161, and the input shaft 150 and the first gear shaft 153 are connected/disconnected by the second clutch mechanism 162. Incidentally, a substantial half of the aforementioned motor case 105 is positioned in the space which is defined between the gear 126 and the idle gear 167, and the first clutch mechanism 161.

In the second case 104, there is disposed an output shaft 163 which is arranged on an axis H in parallel with the axis G. One end side of the output shaft 163 is supported by a bearing 164 which is fixed in the inner circumferential face of the bulging portion 109. The other end side of the output shaft 163 is supported by a bearing 166 which is fixed on a frame 165 protruded into the inner face of the second case 104. On the output shaft 163 at the side of the bearing 164, there is fitted a final gear 171. This final gear 171 corresponds to the output member of the present invention. The final gear 171 is identical to the drive gear 152 in its arranged position in the axial direction. This final gear 171 meshes with a ring gear 173 of a differential 172 which is disposed at the side of the transmission E.

On the other hand, the output shaft 163 is equipped on its outer circumference with a first driven gear 174, a second driven gear 175, a third driven gear 176 and a fourth driven gear 177 at a predetermined interval from the side of the final gear 171 to the side of the bearing 166. The first driven gear 174, the second driven gear 175, the third driven gear 176 and the fourth driven gear 177 are individually made rotatable with respect to the output shaft 163. The first driven gear 174 meshes with the drive gear 155; the second driven gear 175 meshes with the drive gear 156; the third driven gear 176 meshes with the drive gear 157; and the fourth driven gear 177 meshes with the drive gear 158.

The fourth driven gear 177 is set to have an external diameter larger than that of the first driven gear 174; the second driven gear 175 is set to have an external diameter smaller than that of the fourth driven gear 177; and the third driven gear 176 is set to have an external diameter smaller than that of the second driven gear 175.

The output shaft 163 is equipped on its outer circumference with a first synchronizer 178 between the first driven gear 174 and the second driven gear 175. To the outer circumference of the output shaft 163, there is splined a parking gear 179 between the second driven gear 175 and the third driven gear 176. The output shaft 163 is equipped on its outer circumference with a second synchronizer 180 between the third driven gear 176 and the fourth driven gear 177.

The first synchronizer 178 has the known structure which is constructed of: an annular clutch hub 181 splined to the output shaft 163; synchronizer rings 182 and 183 disposed at the two sides of the clutch hub 181; and an annular sleeve 184 fitted on the outer circumference of the clutch hub 181. When the sleeve 184 is moved in the direction of the axis H by the not-shown selector or shift fork, either the first driven gear 174 or the second driven gear 175 is connected to the output shaft 163.

The second synchronizer 180 also has the known structure which is constructed of: an annular clutch hub 185 splined to the output shaft 163; synchronizer rings 186 and 187 disposed at the two sides of the clutch hub 185; and an annular sleeve 188 fitted on the outer circumference of the clutch hub 185. When the sleeve 188 is moved in the axial direction H by the not-shown selector or shift fork, either the third driven gear 176 or the fourth driven gear 177 is connected to the output shaft 163. Incidentally, the selector or the shift fork is actuated by a suitable actuator or by a hand.

Figure 9:
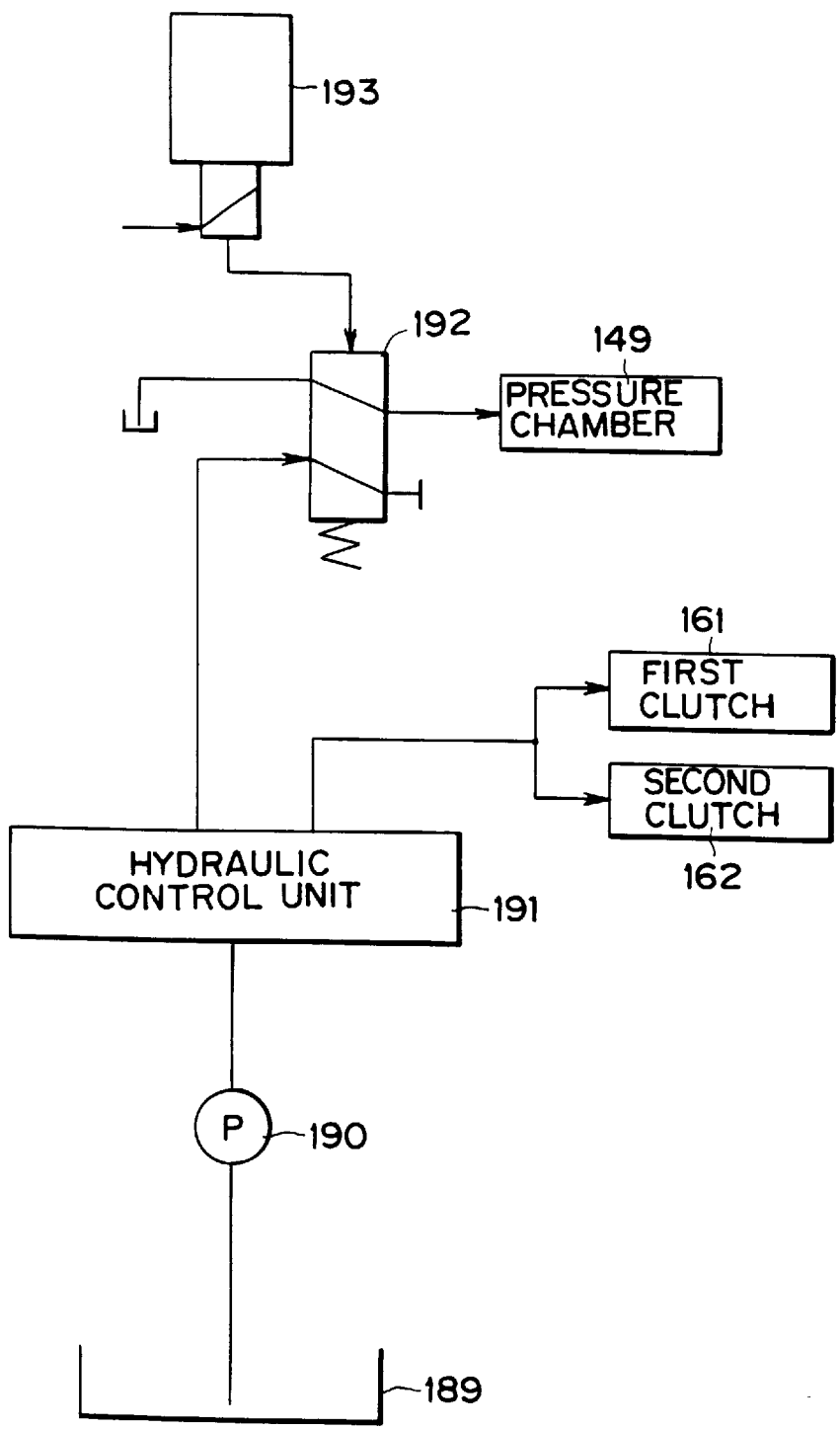
FIG. 9 is a diagram showing a hydraulic circuit to be used in the hybrid drive system of the fourth embodiment of the present invention.

FIG. 9 is a hydraulic circuit diagram for actuating the main clutch 132, the first clutch mechanism 161 and the second clutch mechanism 162. Below the housing 100, there is disposed an oil pan 189 containing the oil, which is pumped by a hydraulic pump 190 and fed to a hydraulic control unit 191. This hydraulic control unit 191 is composed of a regulator valve, a change-over valve, a relief valve, a timing valve and the like, although not shown. The oil pan 189 and the hydraulic pump 190 correspond to the oil pressure source of the present invention.

The hydraulic control unit 191 is connected with a change-over valve 192, which is actuated by a signal pressure from a solenoid valve 193 to control the pressure of the pressure chamber 149. In response to the rise/fall of the oil pressure of the pressure chamber 149, the release shaft 142, as shown in FIG. 7, is actuated to apply/release the main clutch 132.

The hydraulic control unit 191 is further connected to the cylinder for actuating the first clutch mechanism 161 and the second clutch mechanism 162. As a result, the application/release of the first clutch mechanism 161 and the second clutch mechanism 162 are controlled by the actions of the hydraulic control unit 191. In other words, in the fourth embodiment, the first clutch mechanism 161 and the second clutch mechanism 162, and the main clutch 132 are controlled in their actions by the identical oil pressure source, i.e., the oil pan 189 and the hydraulic pump 190.

Incidentally, the oil pan 189 and the hydraulic pump 190 are also constructed to lubricate other mechanism in the housing 100, such as a variety of gears.

Figure 10:
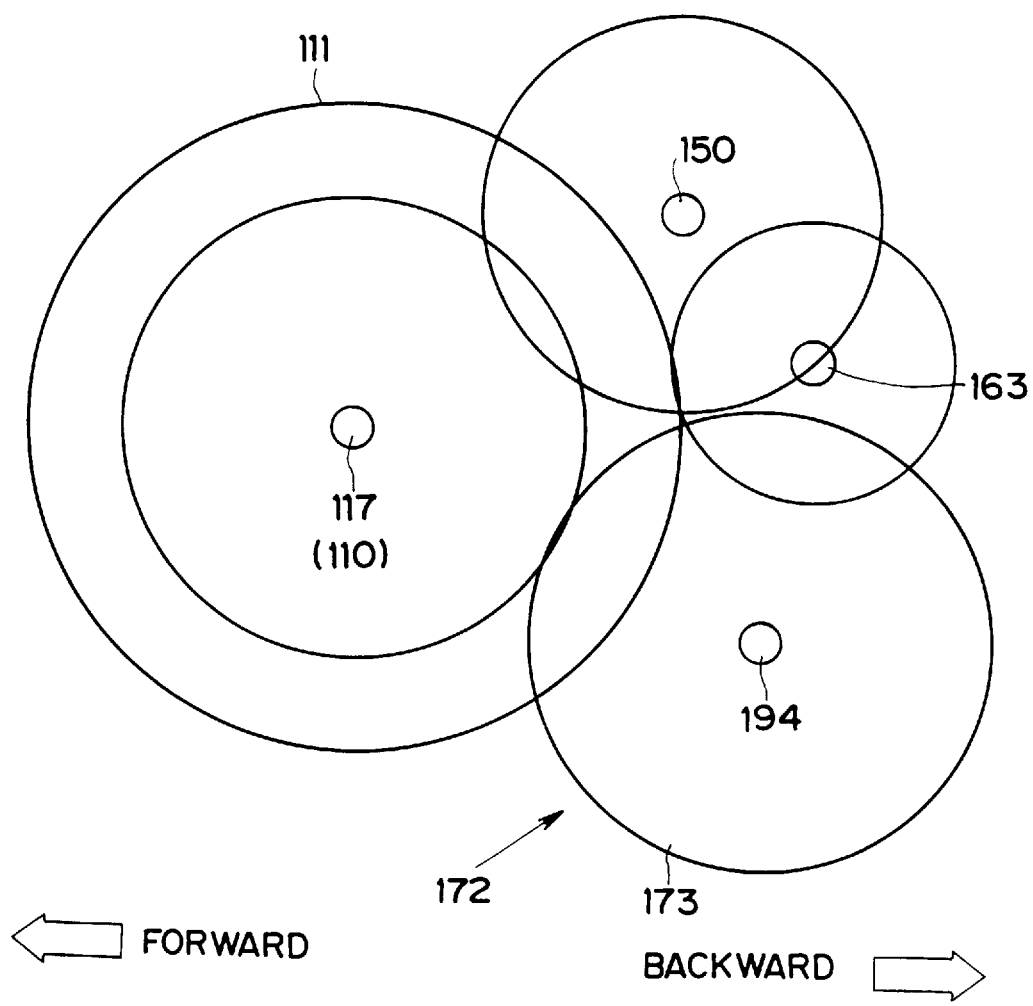
FIG. 10 is an arrangement plan of an input shaft, a motor shaft and an output shaft of the hybrid drive system of the fourth embodiment of the present invention, as viewed from the shaft end side.

FIG. 10 is an arrangement plan showing the aforementioned individual shafts, as viewed from their axial end side. In this embodiment, the hybrid drive system is mounted in the so-called "transverse arrangement", in which the axes of the individual shafts are perpendicular to the longitudinal direction of the vehicle. Of these shafts, the motor shaft 117 and the crankshaft 110 are arranged at the foremost of the vehicle, and the input shaft 150, the output shaft 163 and the drive shaft 194 are arranged at the back of the motor shaft 117.

In the hybrid drive system thus constructed, the torque of the crankshaft 110 is transmitted to the motor shaft 117 by applying the main clutch 132. When the motor generator 101 is energized, the motor shaft 117 is rotated by the torque of the motor generator 101. In this fourth embodiment, too, one of the internal combustion engine 900 and the motor generator 101 can be solely driven, or both of them can be simultaneously driven. The torque of at least one of the motor generator 101 and the internal combustion engine 900 is transmitted through the gear 126 and the idle gear 167 to the input shaft 150.

When the first clutch mechanism 161 or the second clutch mechanism 162 is selectively applied/released, the torque of the input shaft 150 is transmitted to the first gear shaft 153 or the second gear shaft 154. By actuating the first synchronizer 178 or the second synchronizer 180, on the other hand, the torque of the first gear shaft 153 or the second gear shaft 154 is transmitted through any of the first driven gear 174 to the fourth driven gear 177 to the output shaft 163. Incidentally, the control contents of an example of the running modes of the vehicle using the hybrid drive system of the fourth embodiment are similar to those of the first embodiment, as tabulated in FIG. 4.

In the hybrid drive system of the fourth embodiment thus far described, the transmission E and the motor generator 101 are arranged in parallel in such positions that the input shaft 150, the output shaft 163 and the motor shaft 117 are in parallel with one another. As a result, the total length of the internal combustion engine 900, the transmission E and the motor generator 101 is shortened in the axial direction. This improves the mountability of the vehicle and the arrangement of the peripheral devices is less restricted. Moreover, the floor of the vehicle is flattened to provide an effect that the accommodation in the compartment is improved.

In the fourth embodiment, moreover, the drive gear 152, the final gear 171, the gear 126 and the idle gear 167 are arranged at the same position, as taken in the individual axial directions H, G and F. As a result, the area for arranging the individual gears in the individual axial directions H, G and F is narrowed to further shorten the total length of the hybrid drive system in the axial direction.

In the fourth embodiment, furthermore, the construction having the hybrid drive system of the transverse type is adopted to arrange the crankshaft 110 and the motor shaft 117 in the front portion of the vehicle and to arrange the input shaft 150 and the output shaft 163 at the back of those shafts. As a result, the area for arranging the individual shafts in the longitudinal direction of the vehicle is narrowed to provide an effect that the mountability of the vehicle is further improved.

In the fourth embodiment, furthermore, the motor case 105 is kept liquid-tight by the oil seals 143 and 144 and the not-shown gasket so that the oil in the transmission E will not come into the motor case 105. As a result, neither the magnetic field to be established in the small clearance between the rotor 118 and the stator 119 is weakened nor occurs the drive loss of the motor shaft 117, so that a high torque can be achieved.

In the fourth embodiment, furthermore, the motor generator 101 is arranged in the space which is formed between the annular first clutch mechanism 161, and the gear 126 and the idle gear 167. As a result, the motor generator 101 can be brought as close to the input shaft 150 as possible to shorten the inter-axis distance between the input shaft 150 and the motor shaft 117 so that the hybrid drive system is small-sized in its entirety in the direction perpendicular to the axial direction, too.

In the fourth embodiment, furthermore, the piston 148, the first clutch mechanism 161 and the second clutch mechanism 162 are arranged in the same position, as taken in the axial direction, so that the space in the radial direction can be effectively used to reduce the size of the hybrid drive system more in the axial direction.

In the fourth embodiment, furthermore, the main clutch 132, the first clutch mechanism 161 and the second clutch mechanism 162 are controlled by the single or common oil pressure source, as exemplified by the oil pan 189 and the hydraulic pump 190. As a result, the number of parts necessary for the controls and the space for mounting the parts can be suppressed to make a contribution to the size reduction of the whole system.

In the fourth embodiment, furthermore, the oil pan 189 and the hydraulic pump 190 or the oil pressure source for lubricating or controlling the operations of the mechanisms, as disposed in the transmission E, also act as the oil pressure source for controlling the actions of the first clutch mechanism 161, the second clutch mechanism 162 and the main clutch 132. Without any special provision of the power source for controlling the first clutch mechanism 161, the second clutch mechanism 162 and the main clutch 132, therefore, the number of parts and the space for mounting the parts can be suppressed to further promote the size reduction of the whole system.

Figure 11:
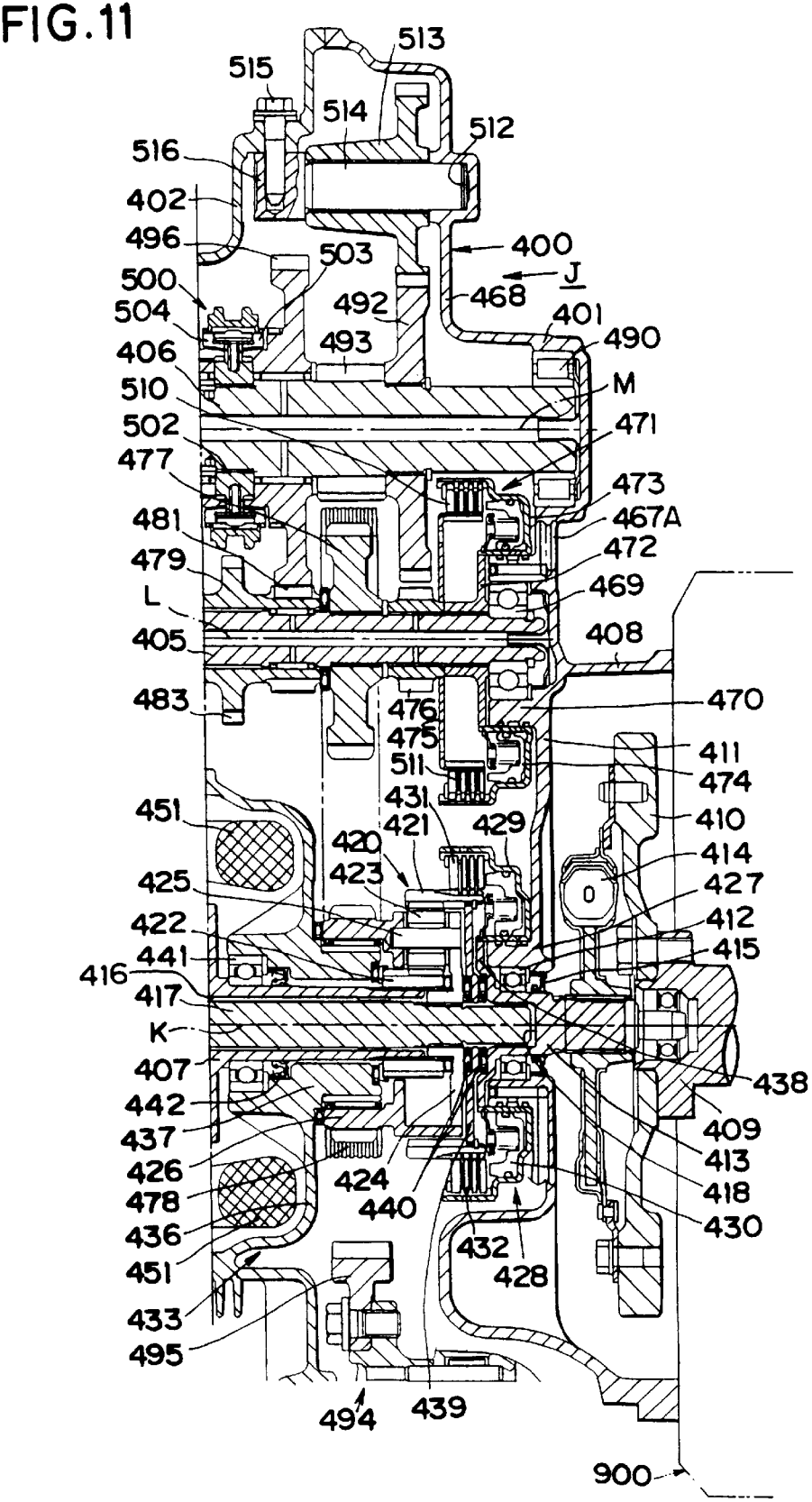
FIG. 11 is a section showing one divided half of a hybrid drive system according to a fifth embodiment of the present invention.
Figure 12:
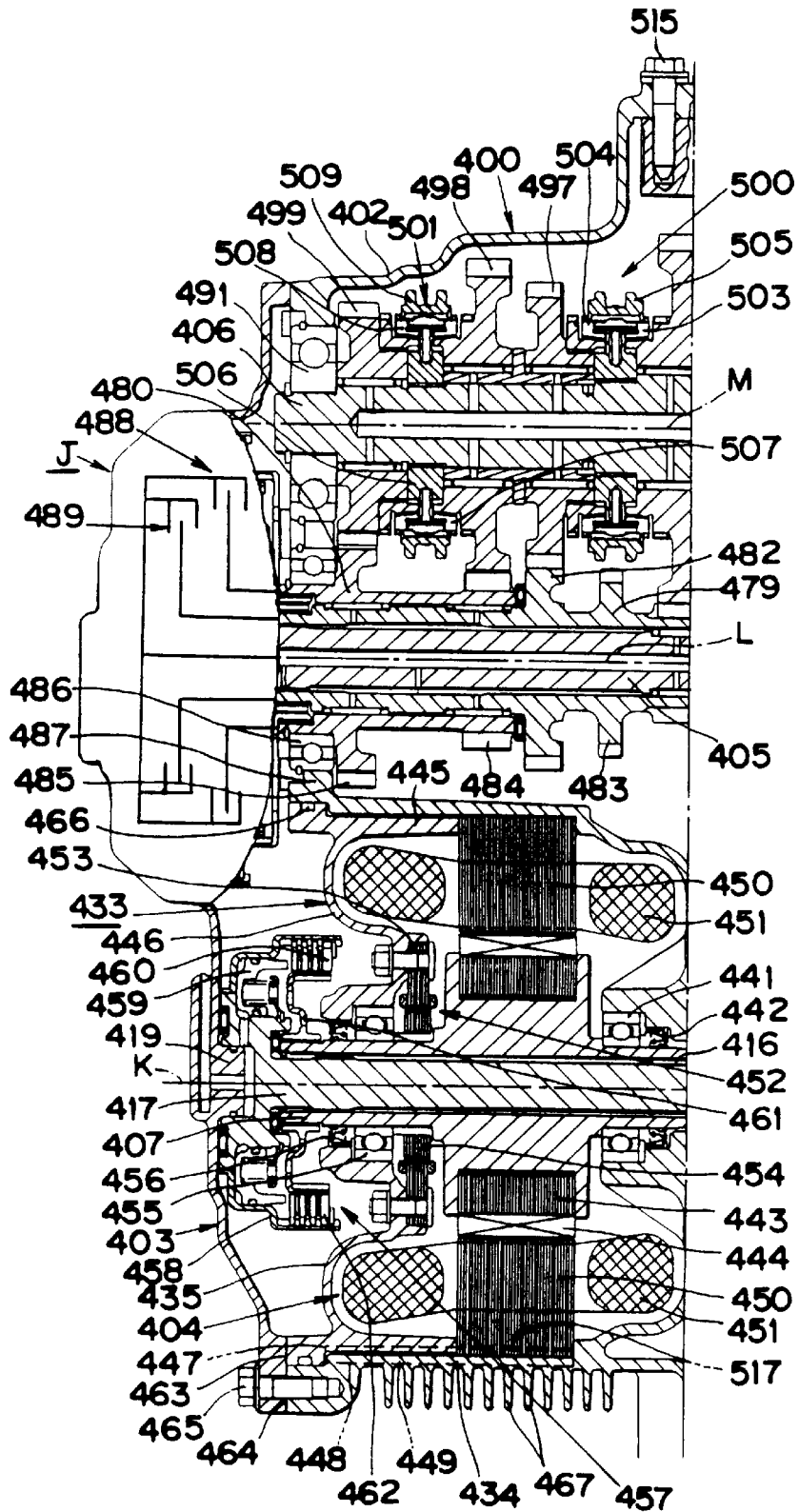
FIG. 12 is a section showing the other half of the hybrid drive system according to the fifth embodiment of the present invention.

FIGS. 11 and 12 are sections showing the hybrid drive system according to a fifth embodiment in a divided manner. A transmission J of this fifth embodiment has a hollow housing 400, which is constructed by fixing a first case 401 and a cover 403 separately on the two sides of a second case 402. An input shaft 405 and an output shaft 406 are disposed in the housing 400, and a motor generator 404 is arranged in parallel with the transmission J. Moreover, a hollow motor shaft 407 of the motor generator 404 is arranged in parallel with the input shaft 405 and the output shaft 406.

In the first case 401, there is disposed a cylindrical portion 408 which centers an axis K of the motor shaft 407. In this cylindrical portion 408, there is inserted the rear end of a crankshaft 409 of the internal combustion engine 900. The crankshaft 409 corresponds to the drive shaft of the present invention. Thus, the motor shaft 407 and the crankshaft 409 are arranged on the common axis K, whereas a flywheel 410 is fixed on the rear end of the crankshaft 409.

On the other hand, the cylindrical portion 408 is equipped with a partition portion 411, and a boss 427 is protruded from the inner circumference of the partition portion 411 toward the motor generator 404. A first transmission shaft 413 is fitted in the inner circumference of the boss 427 through a bearing 412. On the outer circumference of the end portion of the first transmission shaft 413 at the side of the crankshaft 409, there is fitted a damper spring 414 which connects the first transmission shaft 413 and the flywheel 410. In the inner circumference of the boss 427, there is fitted an oil seal 415 which keeps the boss 427 and the first transmission shaft 413 liquid-tight.

In the aforementioned motor shaft 407, on the other hand, there is formed therethrough in the axial direction K an axial bore 416, into which is inserted a second transmission shaft 417. This second transmission shaft 417 and the motor shaft 407 are made rotatable relatively each other, and one end side of the second transmission shaft 417 is rotatably fitted in a holding bore 418 formed in the first transmission shaft 413. On the other hand, the other end side of the second transmission shaft 417 is rotatably supported by a cylindrical support portion 419 which is protruded into the inner face of the cover 403.

Moreover, the motor shaft 407 and the second transmission shaft 417 are equipped, on the outer circumferences of their end portions at the side of the partition portion 411, with a planetary gear mechanism 420. This planetary gear mechanism 420 is composed of: a ring gear 421; a sun gear 422 fitted on the outer circumference of the motor shaft 407; and a pinion gear 423 interposed between the ring gear 421 and the sun gear 422. To the second transmission shaft 417, there is splined an annular carrier 424, which retains the pinion gear 423 by its pinion pin 425. To the other end side of the pinion pin 425, on the other hand, there is connected an annular sprocket 426, which corresponds to a portion of the input member and the transmission mechanism of the present invention.

The boss 427 is equipped therearound with a main clutch 428 for connecting/disconnecting the ring gear 421 and the first transmission shaft 413. The main clutch 428 is composed of an annular drum 429 bend to have a shape of square section and having its opening directed toward the motor generator 404, and a piston 430 inserted into the drum 429 to move in the axial direction K. The main clutch 428 is further composed of a plurality of annular discs 431 splined to the inner circumference of the drum 429, and a plurality of annular plates 432 splined to the outer circumference of the ring gear 421.

The inner circumferential end of the drum 429 is fixed on the outer circumferential end of a flange 438 which is formed at the first transmission shaft 413, and an annular plate 439 holding the ring gear 421 is interposed between the flange 438 and the carrier 424. At the two sides of the plate 439, there is disposed a thrust bearing 440, which positions the plate 439. Thus, the action of the piston 430 is controlled by the not-shown oil pressure source to bring the discs 431 and the plates 432 into and away from abutment to connect and disconnect the first transmission shaft 413 and the ring gear 421.

The aforementioned motor generator 404 is accommodated in a motor case 433 which is integrated with the second case 402. The motor case 433 is composed of a cylindrical body portion 434 integrated with the second case 402, and a cover portion 435 closing the open end of the body portion 434 at the side of the cover 403. The body portion 434 is equipped at its end portion at the side of the partition portion 411 with a partition portion 436, which is integrated with a boss portion 437 at its inner circumferential end. The aforementioned sprocket 426 is rotatably held in the outer circumference of the boss portion 437 at the side of the partition wall 411. In the inner circumference of the boss portion 437 at the side of the motor generator 404, moreover, there is fixed a bearing 441 which supports the motor shaft 417. An oil seal 442 is also provided for keeping the motor shaft 407 light-tight therearound.

An annular rotor 443 is fixed on the outer circumference of the motor shaft 407, and a magnet 444 is mounted in the outer circumferential portion of the rotor 443.

The aforementioned cover portion 435 is composed of a cylindrical portion 445 fitted in the inner circumference of the body portion 434, and an end face portion 446 formed at the inner circumferential end of the cylindrical portion 445 at the side of the cover 403. The outer circumference of the cylindrical portion 445, the inner circumference of the body portion 434, and a stator 450 have key grooves 447, 448 and 517, which extend in the axial direction K.

By inserting a key 449 into those key grooves 447, 448 and 517, moreover, the cover portion 435 is circumferential fixed with respect to the body portion 434, and the stator 450 is also simultaneously fixed. With the outer end face 463 of the cylindrical portion 445 and the outer end face 464 of the second case 402 being in a plane and in abutment against the inner face of the cover 403, moreover, the cover 403 is fixed on the second case 402 by fastening screws 465.

Between the inner circumference of the second case 402 and the outer circumference of the cylindrical portion 445, there is sandwiched an O-ring 466 which keeps them liquid-tight. Thus, the motor case 433 is kept liquid-tight by the oil seal 442, an oil seal 456 and the O-ring 466 so that the oil in the housing 400 is prevented from invasion into the motor case 433. Incidentally, the body portion 434 is equipped on its outer face with fins 467 for emitting the heat at the drive time of the motor generator 404 to cool the motor generator 404.

Between the inner end face of the aforementioned cylindrical portion 445 and the step portion of the inner circumferential face of the body portion 434, there is fixed the stator 450 along the circumferential direction. A coil 451 is wound on each stator 450, and a small clearance is formed between the stator 450 and the rotor 443. The motor generator 404 thus constructed is given the power function, in which a magnetic field is established in the small clearance by the energization of the not-shown battery to rotate the motor shaft 407 in the predetermined direction, and the regenerative function, in which the mechanical energy is transformed into an electric energy to charge the battery with the electric energy.

In the vicinity of the motor generator 404, there is disposed a resolver 452 for detecting the angle of rotation of the motor generator 404. This resolver 452 is composed of: a stator 453 fixed on the end face portion 446; a rotor 454 fixed on the outer circumference of the motor shaft 407; and a coil wound on the stator 453. In the inner circumference of the end face portion 446, moreover, there are fitted a bearing 455 supporting the motor shaft 407, and the oil seal 456 for keeping the end face portion 446 and the motor shaft 407 liquid-tight.

Moreover, the end portion of the motor shaft 407 at the side of the cover 403 and the end portion of the second transmission shaft 417 at the side of the cover 403 are connected/disconnected by a motor shaft clutch 457. The motor shaft clutch 457 is composed of a cylindrical drum 458 fixed on the outer circumferential end of the second transmission shaft 417, and a piston 459 so inserted in the inner circumference of the drum 458 as to move in the axial direction K. The motor shaft clutch 457 is further composed of an annular disc 460 splined to the inner circumference of the drum 458, an annular clutch hub 461 fixed on the outer circumferential end of the motor shaft 407, and an annular plate 462 splined to the outer circumference of the clutch hub 461. By controlling the action of the piston 459 through the not-shown oil pressure source, moreover, the second transmission shaft 417 and the motor shaft 407 are connected/disconnected.

The aforementioned first case 401 is equipped on the outer circumferential side of the cylindrical portion 408 with a bulging portion 467A which is generally perpendicular to the axis K, and a bent portion 468 having a generally L-shaped section is formed on the outer circumference of the bulging portion 467A. On the inner face at the joint portion between the bulging portion 467A and the cylindrical portion 408, there is formed a boss 470 which is directed toward the cover 403 to fix a bearing 469 in its inner circumference. In the inner face of the cover 403 at a position opposed to the bearing 469, on the other hand, there is disposed the not-shown bearing which supports the two ends of the input shaft 405 together with the bearing 469.

The input shaft 405 is equipped on its outer circumference in the vicinity of the bearing 469 with a reverse clutch 471. This reverse clutch 471 is composed of: an annular member 472 splined to the input shaft 405; a drum 473 having a generally square section and fixed on the outer circumference of the annular member 472; a piston 474 so fitted in the inner circumference of the drum 473 as to move in the direction of an axis L of the input shaft 405; and an annular clutch hub 475. A plurality of annular discs 510 are splined to the inner circumference of the drum 473, and an annular plate 511 is splined to the outer circumference of the clutch hub 475.

The input shaft 405 is equipped on its outer circumference adjacent to the annular member 472 with a reverse gear 476. This reverse gear 476 is made rotatable relatively to the input shaft 405, and the inner circumferential end of the clutch hub 475 is connected to the end portion of the reverse gear 476. Incidentally, the position of the gear 476 in the axial direction L is set substantial identical to that of the planetary gear mechanism 420 in the axial direction K.

The reverse clutch 471 thus constructed is applied/released by controlling the action of the piston 474 through the not-shown oil pressure source. The rotation of the input shaft 405 is transmitted to the gear 476, when the reverse clutch 471 is applied, but not when released.

To the input shaft 405 at a position closer to the cover 403 than the reverse gear 476, on the other hand, there is splined a sprocket 477, which corresponds to the input member of the present invention. Between the sprocket 477 and the aforementioned sprocket 426, there is tensed a silent chain 478, which corresponds a portion of the input member or the transmission mechanism of the present invention. Moreover, the input shaft 405 is equipped on the outer circumference at a position closer to the cover 403 than the sprocket 477 with a first gear shaft 479, which is equipped on its outer circumference with a second gear shaft 480.

The first gear shaft 479 is equipped with drive gears 481 and 482 and further with a parking gear 483 between the drive gears 481 and 482. On the other hand, the second gear shaft 480 is equipped with drive gears 484 and 485. The drive gear 484 is set to have an external diameter larger than that of the drive gear 481; the drive gear 482 is set to have an external diameter larger than that of the drive gear 484; and the drive gear 485 is set to have an external diameter larger than that of the drive gear 482.

The second gear shaft 480 is supported at a position closer to the cover 403 than the drive gear 485 by a bearing 486. This bearing 486 is supported by a protruding portion 487 which is formed at the end portion of the body portion 434 of the case 433. Incidentally, the end portions of the input shaft 405, the first gear shaft 479 and the second gear shaft 480 at the side of the cover 403 are equipped with a first clutch mechanism 488 and a second clutch mechanism 489. The first clutch mechanism 488 is provided for connecting/disconnecting the input shaft 405 and the second gear shaft 480, and the second clutch mechanism 489 is provided for connecting/disconnecting the input shaft 405 and the first gear shaft 479.

On the other hand, the aforementioned bulging portion 467A is equipped on its inner face outside of the bearing 469 with a bearing 490, and the aforementioned protruding portion 487 is equipped at a position opposed to the bearing 490 with a bearing 491. These bearings 490 and 491 support the two ends of the output shaft 406. This output shaft 406 is equipped at the same position as the gear 476 in the direction of an axial line M with a reverse driven gear 492. The output shaft 406 is further equipped at a position closer to the cover 403 than the reverse driven gear 492 with a final gear 493, which corresponds to the output member of the present invention. This final gear 493 is in meshing engagement with a ring gear 495 of a differential 494, as disposed in the vicinity of the transmission J. Incidentally, the final gear 493, the silent chain 478 and the sprockets 426 and 477 are arranged in the same position, as taken in the axial direction.

On the other hand, the output shaft 406 is equipped with a first driven gear 496, a second driven gear 497, a third driven gear 498 and a fourth driven gear 499 at a predetermined interval from the vicinity of the final gear 493 to the bearing 491. The first driven gear 496, the second driven gear 497, the third driven gear 498 and the fourth driven gear 499 are made rotatable relatively to the output shaft 406. The first driven gear 496 meshes with the drive gear 481, and the second driven gear 497 meshes with the drive gear 482. The third driven gear 498 meshes with the drive gear 484, and the fourth driven gear 499 meshes with the drive gear 485.

The output shaft 406 is equipped with a first synchronizer 500 between the first driven gear 496 and the second driven gear 497 and with a second synchronizer 501 between the third driven gear 498 and the fourth driven gear 499. The first synchronizer 500 is given the known structure which is constructed of: an annular clutch hub 502 splined to the output shaft 406; synchronizer rings 503 and 504 disposed at the two sides of the clutch hub 502; and a sleeve 505 fitted on the outer circumference of the clutch hub 502. The second synchronizer 501 is also given the known structure which is constructed of: an annular clutch hub 506 splined to the output shaft 406; synchronizer rings 507 and 508 disposed at the two sides of the clutch hub 506; and a sleeve 509 fitted on the outer circumference of the clutch hub 506.

As a result, when the first synchronizer 500 and the second synchronizer 501 are in neutral positions, the rotation of the input shaft 405 is not transmitted to the output shaft 406. On the other hand, when either the first synchronizer 500 or the second synchronizer 501 is moved in either of the axial directions M to connect the output shaft 406 to any of the first driven gear 496, the second driven gear 497, the third driven gear 498 and the fourth driven gear 499, the torque of the input shaft 405 is transmitted to the output shaft 406.

In the inner face of the bent portion 468 of the aforementioned first case 401, there is formed a recessed portion 512, in which is fitted one end of a gear shaft 514 of a reverse idle gear 513. This reverse idle gear 513 is in meshing engagement with the reverse driven gear 492. It is quite natural that the reverse idle gear 513 is generally in the same position in the axial direction M as that of the reverse driven gear 492. Incidentally, the second case 402 is equipped with a screw 515 extending from the outer face to the inner face, and a stopper 516, fixed on the leading end of the screw 515, is molded integrally with the shaft 514. The reverse gear 476, the reverse driven gear 492 and the reverse idle gear 513, as described above, correspond to the reverse gear of the present invention.

Figure 13:
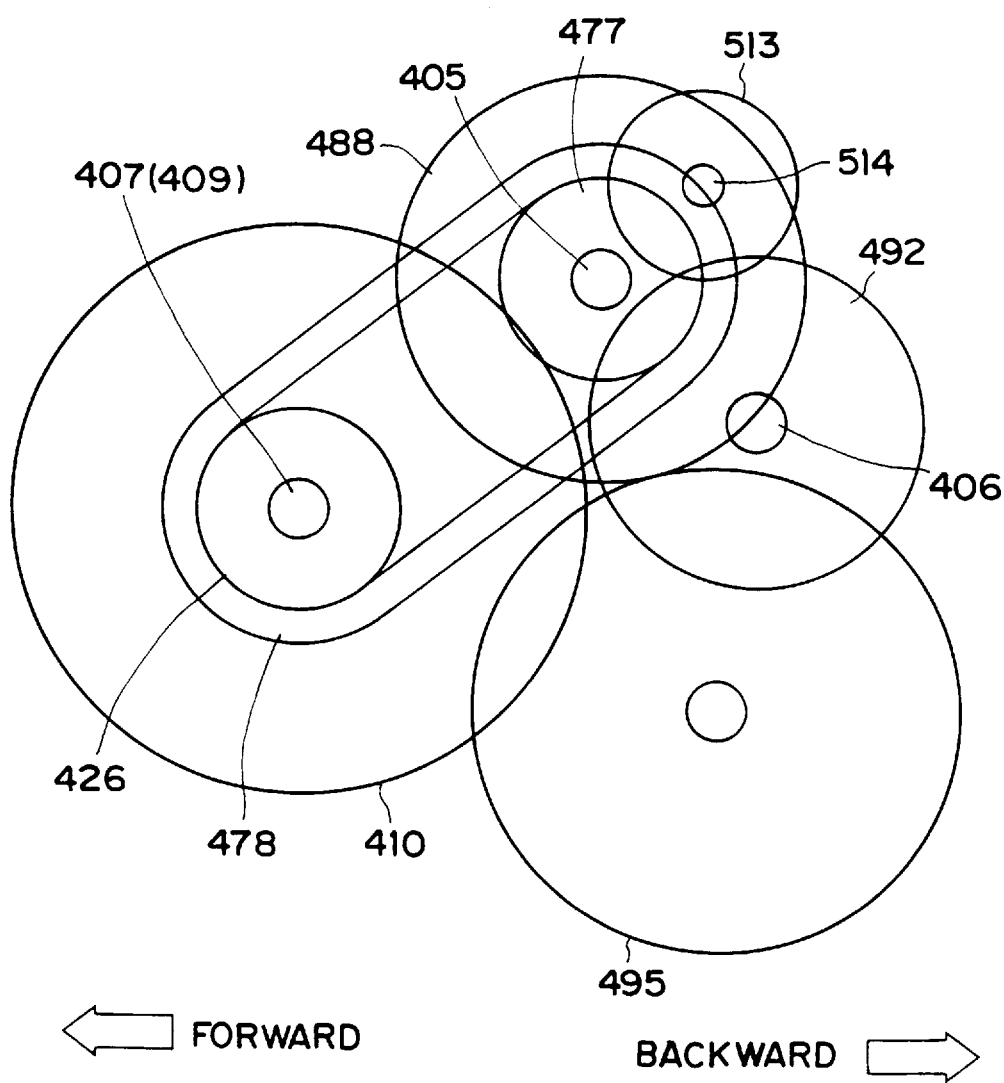
FIG. 13 is an arrangement plan of an input shaft, a motor shaft and an output shaft of the hybrid drive system of the fifth embodiment of the present invention, as viewed from the shaft end side.

FIG. 13 is an arrangement plan showing the individual shafts, as viewed from the shaft end side. The hybrid drive system, as shown in FIG. 13, is mounted in the transverse arrangement in which the axes of the individual shafts are perpendicular to the longitudinal direction of the vehicle. Of these shafts, the motor shaft 407 and the crankshaft 409 are arranged in the foremost position of the vehicle, and the input shaft 405 and the output shaft 406 are arranged at the back of the motor shaft 407.

Next, an example of the running modes of the vehicle using the hybrid drive system having the aforementioned construction will be described with reference to FIG. 14. Symbols O appearing in FIG. 14 indicate that the individual clutches and synchronizers are applied, and blanks and symbols X indicate that they are released. These running modes can be set to Mode 1, at which only the internal combustion engine 900 is used as the power source, to Mode 2, at which only the motor generator 404 is used as the power source, and to Mode 3 at which both the internal combustion engine 900 and the motor generator 404 are used as the power source.

First of all, in the parking range (P), the first synchronizer 500 and the drive gear 481 are connected, whereas the rotation regulating member in the transmission J, i.e., the parking lock pole is made to mesh with the parking gear 483. The remaining apply/release mechanisms such as the clutch mechanisms and the synchronizers are all released. As a result, the rotation of the parking gear 483 is restricted by the parking lock pole so that the rotations of the first gear shaft 479 and the output shaft 406 are restricted to hold the stop state. Thanks to the high gear ratio of this case between the drive gear 481 and the first driven gear 496 meshing with each other, it is possible to reduce the load to be applied to the parking gear 483 and the parking lock pole. When the neutral range (N) is selected, all the apply/release mechanisms are released.

Then, the internal combustion engine 900 is started by the action of the not-shown starting motor. When the first forward speed in Mode 1 is selected, the main clutch 428, the motor shaft clutch 457 and the second clutch mechanism 489 are applied. By the action of the first synchronizer 500, moreover, the first driven gear 496 and the output shaft 406 are connected. As a result, the torque of the internal combustion engine 900 is transmitted through the first transmission shaft 413 and the chain 478 to the input shaft 405. This torque is transmitted through the first gear shaft 479 and the first driven gear 496 to the output shaft 406 and then through the final gear 493 to the differential 494.

When the second forward speed in Mode 1 is selected, the main clutch 428, the motor shaft clutch 457 and the first clutch mechanism 488 are applied. By the action of the second synchronizer 501, moreover, the third driven gear 498 and the output shaft 406 are connected. As a result, the torque of the internal combustion engine 900 is transmitted through the first transmission shaft 413 and the chain 478 to the input shaft 405. This torque is transmitted through the second gear shaft 480 and the third driven gear 498 to the output shaft 406 and then through the final gear 493 to the differential 494.

When the third forward speed in Mode 1 is selected, the main clutch 428, the motor shaft clutch 457 and the second clutch mechanism 489 are applied, and the second driven gear 497 and the output shaft 406 are connected by the first synchronizer 500. As a result, the torque of the internal combustion engine 900 is transmitted through the first transmission shaft 413 and the chain 478 to the input shaft 405. This torque is further transmitted through the first gear shaft 479 and the second driven gear 497 to the output shaft 406 and then through the final gear 493 to the differential 494.

When the fourth forward speed in Mode 1 is selected, the main clutch 428, the motor shaft clutch 457 and the first clutch mechanism 488 are applied. By the second synchronizer 501, moreover, the fourth driven gear 499 and the output shaft 406 are connected. As a result, the torque of the internal combustion engine 900 is transmitted through the first transmission shaft 413 and the chain 478 to the input shaft 405. This torque is further transmitted through the second gear shaft 480 and the fourth driven gear 499 to the output shaft 406 and then through the final gear 493 to the differential 494.

When the reverse stage (R) in Mode 1 is selected, the main clutch 428, the motor shaft clutch 457 and the reverse clutch 471 is applied. As a result, the torque of the internal combustion engine 900 is transmitted through the first transmission shaft 413 and the chain 478 to the input shaft 405. This torque is further transmitted through the reverse drive gear 476 and the reverse idle gear 513 to the output shaft 406 so that the output shaft 406 is rotated backward of the direction of the forward stage. The torque of the output shaft 406 is then transmitted through the final gear 493 to the differential 494.

When the individual forward stages and the reverse stage in Mode 2 are selected, on the other hand, controls similar to those in Mode 1 are executed excepting that the main clutch 428 is released, so that the vehicle is driven exclusively by the torque of the motor generator 404.

When Mode 3 is selected, moreover, the motor shaft clutch 457 may be either applied or released. The remaining control contents are similar for both the forward stages and the reverse stage to those in Mode 1. In this Mode 3, the torque of the internal combustion engine 900 and the torque of the motor generator 404 are fused to drive the vehicle. Incidentally, at the forward stages, the input shaft 405 and the output shaft 406 are rotated in the opposite directions to each other. At the reverse stage, however, the torque is transmitted through the reverse idle gear 513 so that the input shaft 405 and the output shaft 406 are rotated in the same direction.

Thus, in the hybrid drive system of the fifth embodiment, the motor shaft 407, the input shaft 405 and the output shaft 406 are arranged in parallel with one another so that the total length in the axial direction can be shortened. As a result, there can be achieved the effects that the mountability of the vehicle and arrangement of the peripheral devices is less restricted, and that the compartment floor is flattened to improve the accommodation of the compartment.

In the fifth embodiment, moreover, the sprockets 426 and 477, the silent chain 478 and the final gear 493 are arranged in the same position, as taken in the axial direction. As a result, the area for arranging these members in the axial direction can be narrowed to further shorten the total length in the axial direction.

In the fifth embodiment, furthermore, the planetary gear mechanism 420, the reverse drive gear 476, the reverse driven gear 492 and the reverse idle gear 513 are generally in the same position, as taken in the axial direction. As a result, the area for arranging the individual parts in the axial direction can be narrowed to further shorten the total length of the hybrid drive system in the axial direction.

In the fifth embodiment, furthermore, the hybrid drive system is mounted in the transverse position, and the input shaft 405 and the output shaft 406 are arranged at the back of the motor shaft 407. As a result, the area for arranging the individual shafts in the longitudinal direction of the vehicle can be narrowed to further improve the mountability.

In the fifth embodiment, furthermore, the body portion 434, the cover portion 435 and the stator 450 are fixed by means of the single key 449 so that the number of fixing parts can be reduced. At the assembling process of the hybrid drive system, on the other hand, the body portion 434, the cover portion 435 and the stator 450 can be mutually positioned and fixed merely by the simple works of moving them along the axial direction so that the number of assembling steps is reduced to improve the assembling ease and productivity.

Furthermore, the motor case 433 is kept liquid-tight by the sealing device such as the oil seals 442 and 456 and the O-ring 466 so that the oil in the transmission J can be prevented from invasion into the motor case 433. As a result, the magnetic field and rotation to be established by the motor generator 404 can be kept so satisfactory as to exhibit the stable driving characteristics for a long time.

In the fifth embodiment, furthermore, the substantial half of the motor case 433 accommodating the motor generator 404 is arranged in the space which is formed by the sprocket 426, the silent chain 478 and the first clutch mechanism 488. As a result, the inter-axis distance between the motor shaft 407 and the input shaft 405 can be shortened to narrow the area for arranging the hybrid drive system in the direction perpendicular to the axis.

Figure 15:
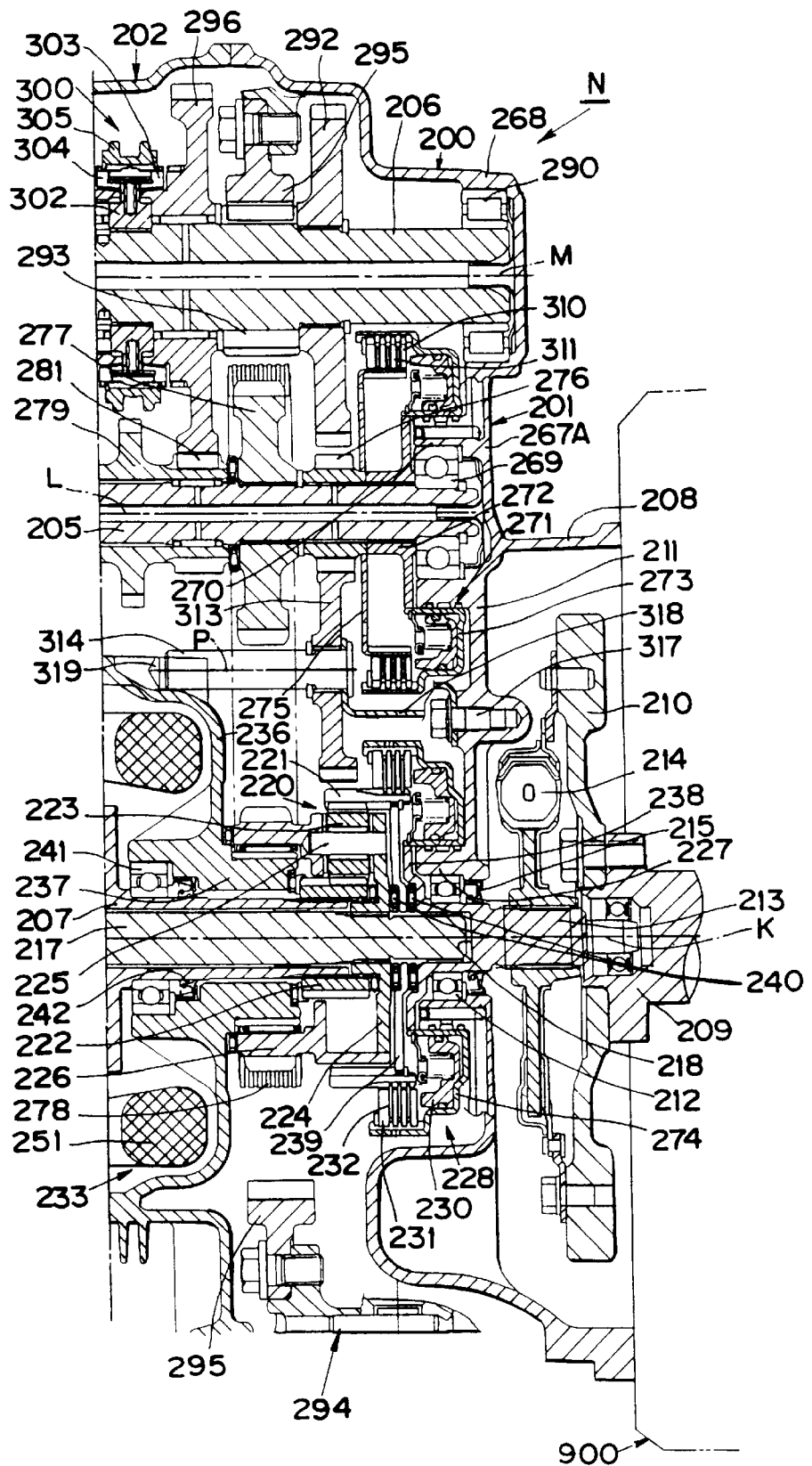
FIG. 15 is a section showing one divided half of a hybrid drive system according to a sixth embodiment of the present invention.
Figure 16:
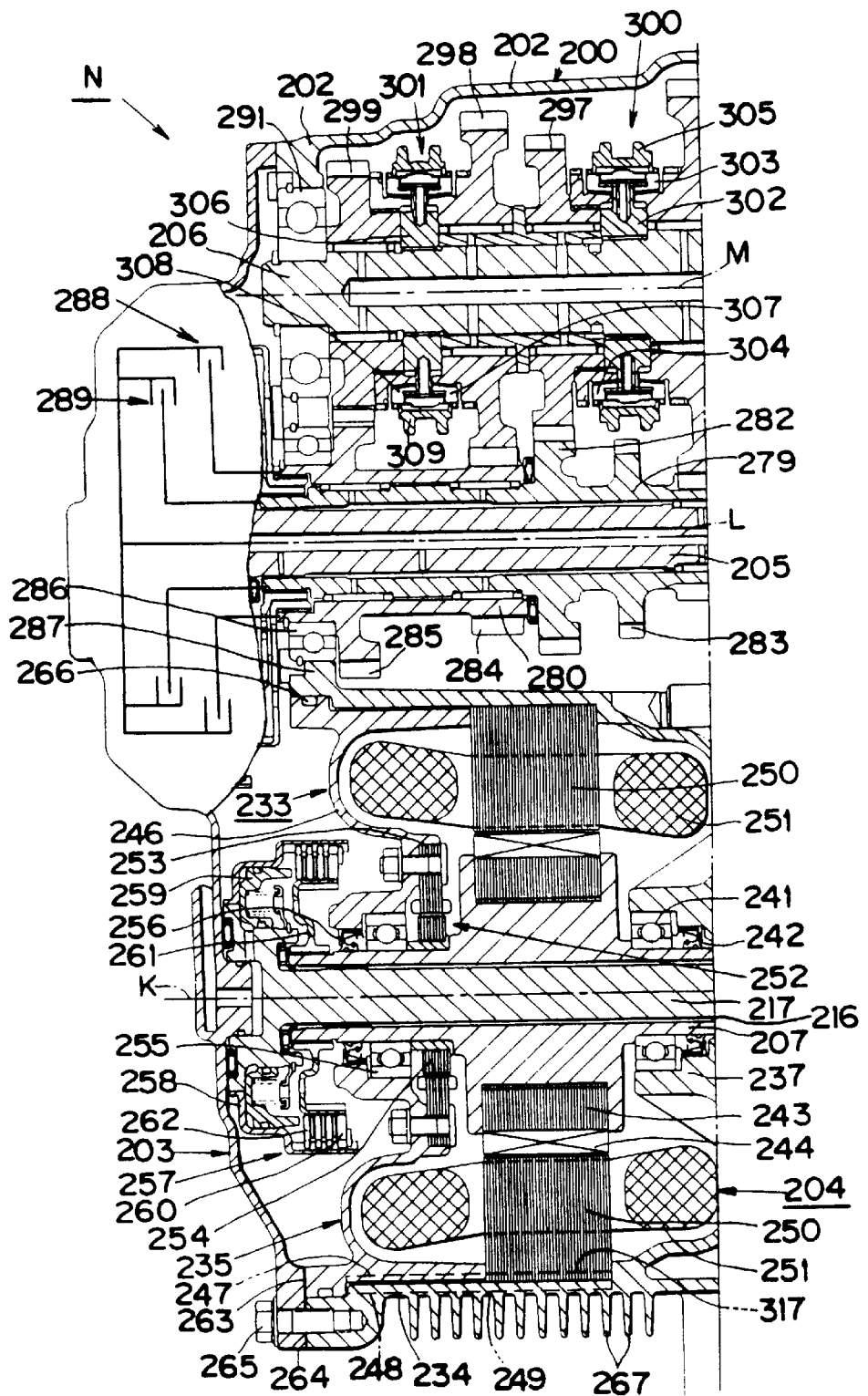
FIG. 16 is a section showing the other half of the hybrid drive system according to the sixth embodiment of the present invention.

FIGS. 15 and 16 are sections showing a hybrid drive system of a sixth embodiment in a divided manner. In this sixth embodiment, there is disposed at the back of the internal combustion engine 900 a transmission N, which has a hollow housing 200. The housing 200 is constructed by fixing a first case 201 and a cover 203 separately at the two sides of a second case 202. On the other hand, a motor generator 204 is arranged in parallel with the transmission N, and an input shaft 205 and an output shaft 206 are disposed in the housing 200. Moreover, a motor shaft 207 of the motor generator 204 is arranged in parallel with the input shaft 205 and the output shaft 206.

The first case 201 is equipped with a cylindrical portion 208 which centers the axis K of the motor shaft 207. In this cylindrical portion 208, there is inserted the rear end of a crankshaft 209 of the internal combustion engine 900, which corresponds to the drive shaft of the present invention. Thus, the motor shaft 207 and the crankshaft 209 are arranged on the common axis K, whereas a flywheel 210 is fixed on the rear end of the crankshaft 209.

On the other hand, the cylindrical portion 208 is equipped on its inner circumference with a partition portion 211, which is equipped in its inner circumference with a boss 227 protruded toward the motor generator 204. In the inner circumference of the boss 227, there is fitted through a bearing 212 a first transmission shaft 213. This first transmission shaft 213 is equipped, on the outer circumference of its end portion at the side of the crankshaft 209, with a damper spring 214 connecting the first transmission shaft 213 and the flywheel 210. Incidentally, the boss 227 is equipped in its inner circumference with an oil seal 215, which keeps the boss 227 and the first transmission shaft 213 liquid-tight.

Through the aforementioned motor shaft 207, on the other hand, there is extended along the axial direction K an axial bore 216, into which is inserted a second transmission shaft 217. This second transmission shaft 217 and the motor shaft 207 are made rotatable relatively each other, and one end side of the second transmission shaft 217 is rotatably fitted in a holding bore 218 formed in the first transmission shaft 213. The other end side of the second transmission shaft 217 is rotatably supported by a column-shaped support portion 219 which is protruded from the inner face of the cover 203.

On the other hand, the motor shaft 207 and the second transmission shaft 217 are equipped with a planetary gear mechanism 220 on the outer circumferences of their end portions at the side of the partition portion 211. The planetary gear mechanism 220 is composed of: a ring gear 221; a sun gear 222 fitted on the outer circumference of the motor shaft 207; and a pinion gear 223 interposed between the ring gear 221 and the sun gear 222. To the second transmission shaft 217, there is splined an annular carrier 224, which supports the pinion gear 223 by its pinion pin 225. To the other end side of this pinion pin 225, moreover, there is connected an annular sprocket 226, which corresponds to a portion of the input member and the transmission mechanism of the present invention.

The aforementioned boss 227 is equipped therearound with a main clutch 228 for connecting/disconnecting the ring gear 221 and the first transmission shaft 213. The main clutch 228 is composed of an annular drum 229 which is bent to have a generally square section and opened toward the motor generator 204, and a piston 230 which is so fitted in the drum 229 as to move along the axial direction K. The main clutch 228 is further equipped with a plurality of annular discs 231 splined to the inner circumference of the drum 229, and a plurality of annular plates 232 splined to the outer circumference of the ring gear 221. The inner circumferential end of the drum 229 is fixed on the outer circumference of the first transmission shaft 213 at the outer circumferential end of a flange 238.

Between the flange 238 and the carrier 224, on the other hand, there is arranged an annular plate 239 which holds the ring gear 221. At the two sides of the plate 239, there are disposed thrust bearings 240 which position the plate 239. Moreover, the movement of the piston 230 is controlled by the not-shown hydraulic device to bring the disc 231 and the plate 232 into and out of abutment thereby to connect/disconnect the first transmission shaft 213 and the ring gear 221.

The aforementioned motor generator 204 is accommodated in a motor case 233 formed in the second case 202. The motor case 233 is composed of a cylindrical body portion 234 formed integrally with the second case 202, and a cover portion 235 closing the opening of the body portion 234 at the side of the cover 203. The body portion 234 is equipped at the inner circumferential end at the side of the partition portion 211 with a partition portion 236, which is equipped integrally with a cylindrical portion 237 at its inner circumferential end.

On the outer circumference of the cylindrical portion 237 at the side of the partition portion 211, there is rotatably fitted the aforementioned sprocket 226. In the inner circumference of the cylindrical portion 237 at the side of the motor generator 204, moreover, there are fixed a bearing 241 supporting the motor shaft 207 and an oil seal 242 keeping the motor shaft 207 liquid-tight therearound. On the outer circumference of the motor shaft 207, there is fixed an annular rotor 243, which has a magnet 244 mounted in its outer circumferential portion.

The aforementioned cover portion 235 is composed of a cylindrical portion 245 fitted in the inner circumference of the body portion 234, and an end face portion 246 formed at the inner circumferential end of the cylindrical portion at the side of the cover 203. In the outer circumferential face of the cylindrical portion 245, in the inner circumferential face of the body portion 234 and in a stator 250, there are formed key grooves 247, 248 and 317 which are extended in the axial direction K. By inserting a key 249 into those key grooves 247, 248 and 317, moreover, the cover portion 235 is circumferentially fixed with respect to the body portion 234, and the stator 250 is fixed.

Moreover, the outer end face 263 of the cylindrical portion 245 and the outer end face 264 of the second case 202 are in a common plane. With the inner face of the cover 203 being in abutment against the outer end face 263 and the outer end face 264, moreover, the cover 203 is fixed on the second case 202 by fastening screws 265. Between the inner circumferential face of the second case 202 and the outer circumferential face of the cylindrical portion 245, there is sandwiched an O-ring 266, which keeps those circumferential faces liquid-tight.

Thus, the motor case 233 is made so liquid-tight by the oil seal 242, an oil seal 256 and the O-ring 266 that the oil in the housing 200 is prevented from invasion into the case 233. Incidentally, the body portion 234 is equipped on its outer face with fins 267 for emitting the heat at the driving time of the motor generator 204 to cool this motor generator 204.

Between the inner end face of the aforementioned cylindrical portion 245 and the step portion of the inner circumference of the body portion 234, there is circumferentially fixed the stator 250. A coil 251 is wound on the stator 250, and a small clearance is formed between the stator 250 and the rotor 243. In the motor generator 204 thus constructed, a magnetic field is established in the small clearance by the power supply from the not-shown battery. The motor generator 204 is provided with a power function to rotate in a predetermined direction, and a regenerative function to transform the mechanical energy into an electric energy to charge the battery with the electric energy.

In the vicinity of the motor generator 204, there is disposed a resolver 252 for detecting the angle of rotation of the motor generator 204. This resolver 252 is composed of: a stator 253 fixed on the inward flange 246; a rotor 254 fixed on the outer circumference of the motor shaft 207; and a coil wound on the stator 253. Moreover, the end face portion 246 is equipped in its inner circumference with a bearing 255 supporting the motor shaft 207 and the oil seal 256 keeping the end face portion 246 and the motor shaft 207 liquid-tight.

Moreover, the end portion of the motor shaft 207 at the side of the cover 203 and the end portion of the second transmission shaft 217 at the side of the cover 203 are connected/disconnected by a motor shaft clutch 257. This motor shaft clutch 257 is composed of a cylindrical drum 258 fixed on the outer circumferential end of the second transmission shaft 217, and a piston 259 so fitted in the inner circumference of the drum 258 as to move in the axial direction K. The motor shaft clutch 257 is further composed of: an annular disc 260 splined to the inner circumference of the drum 258; an annular clutch hub 261 fixed on the outer circumferential end of the motor shaft 207; and an annular plate 262 splined to the outer circumference of the clutch hub 261. By controlling the movement of the piston 259 by the not-shown oil pressure source, moreover, the second transmission shaft 217 and the motor shaft 207 are connected/disconnected.

In the aforementioned first case 201, the cylindrical portion 208 is equipped at its outer circumference with a bulging portion 267A which extends perpendicularly to the axis K. This bulging portion 267A is equipped on its outer circumference with a bent portion 268 having a generally L-shaped section. In the inner face at the joint portion between the bulging portion 267A and the cylindrical portion 208, there is formed a boss 270 which is directed toward the cover 203, and a bearing 269 is fixed in the inner circumferential of the boss 270. On the other hand, the (not-shown) bearing is disposed in the inner face of the cover 203 at a position opposed to the bearing 269 so that the two ends of the input shaft 205 are supported by the bearing 269 and the not-shown bearing.

The input shaft 205 is equipped on is outer circumference in the vicinity of the bearing 269 with a reverse clutch 271. This reverse clutch 271 is composed of an annular member 272 splined to the input shaft 205, and a drum 273 having a generally square section and fixed on the outer circumference of the annular member 272. The reverse clutch 272 is further composed of a piston 274 so fitted in the inner circumference of the drum 273 as to move in the axial direction L of the input shaft 205, and annular clutch hub 275. A plurality of annular discs 310 are fitted in the inner circumference of the drum 273, and a plurality of annular plates 311 are splined to the outer circumference of the clutch hub 275.

The input shaft 205 is integrally equipped on its outer circumference adjacent to the annular member 272 with a reverse drive gear 276. This reverse drive gear 276 and the input shaft 205 are made rotatable relatively each other, and the inner circumferential end of the clutch hub 275 is connected to the end portion of the reverse drive gear 276. Incidentally, the position of the reverse drive gear 276 in the axial direction L is set substantially identical to the position of the planetary gear mechanism 220 in the axial direction K.

The reverse clutch 271 thus constructed is applied/released by controlling the movement of the piston 274 by the not-shown hydraulic control unit. The torque of the input shaft 205 is transmitted to the reverse drive gear 276, when the reverse clutch 271 is applied, but not when the same is released.

To the input shaft 205 at a position closer to the cover 203 than the reverse drive gear 276, on the other hand, there is splined a sprocket 277, which corresponds to the input member of the present invention. Between this sprocket 277 and the aforementioned sprocket 226, there is tensed a silent chain 278, which corresponds to a portion of the input member or the transmission member of the present invention. Moreover, the input shaft 205 is equipped on its outer circumference at a position closer to the cover 203 than the sprocket 277 with a first gear shaft 279, which is equipped on its outer circumference with a second gear shaft 280.

The first gear shaft 279 is equipped with drive gears 281 and 282 and with a parking gear 283 between the drive gears 281 and 282. The drive gear 281 corresponds to the low-speed gear of the present invention. On the other hand, the second gear shaft 280 is equipped with drive gears 284 and 285. Of these, the drive gear 284 is set to have an external diameter larger than that of the drive gear 281; the drive gear 282 is set to have an external diameter larger than that of the drive gear 284; and the drive gear 285 is set to have an external diameter larger than that of the drive gear 282.

The second gear shaft 280 is supported at a position closer to the cover 203 than the drive gear 285 by a bearing 286. This bearing 286 is supported by a protruding portion 287 which is formed at the end portion of the body portion 234 of the motor case 233. Incidentally, the input shaft 205, the first gear shaft 279 and the second gear shaft 280 are equipped at their end portions at the side of the cover 203 with a first clutch mechanism 288 and a second clutch mechanism 289.

The first clutch mechanism 288 is provided for connecting/disconnecting the input shaft 205 and the second gear shaft 280, and the second clutch mechanism 289 is provided for connecting/disconnecting the input shaft 205 and the first gear shaft 279. Incidentally, a substantial half of the motor case 235 is arranged in the space which is formed between the first clutch mechanism 288, and the sprocket 226 and the silent chain 278.

On the other hand, a bearing 290 is fitted in the inner face of the aforementioned bulging portion 267A outer (or upper in FIG. 15) than the bearing 269, and a bearing 291 is in the aforementioned protruding portion 287 at a position opposed to the bearing 290. These bearings 290 and 291 support the two ends of the output shaft 206. The output shaft 206 is equipped with a reverse driven gear 292 at the same position as that of the gear 276 in the axial direction M. On the other hand, the output shaft 206 is equipped at a position closer to the cover 203 than the reverse driven gear 292 with a final gear 293, which corresponds to the output member of the present invention. This final gear 293 meshes with a ring gear 295 of a differential 294, as disposed in the vicinity of the transmission N. The final gear 293, the sprockets 277 and 226 and the silent chain 278 are arranged in the same position, as taken in the axial direction.

On the other hand, the output shaft 206 is equipped with a first driven gear 296, a second driven gear 297, a third driven gear 298 and a fourth driven gear 299 at a predetermined interval from the vicinity of the final gear 293 to the bearing 291. Of these, the first driven gear 296 corresponds to the low-speed gear of the present invention. The first driven gear 296, the second driven gear 297, the third driven gear 298, the fourth driven gear 299 and the output shaft 206 are made rotatable relatively one another. The first driven gear 296 is in meshing engagement with the drive gear 281, and the second driven gear 297 is in meshing engagement with the drive gear 282. The third driven gear 298 is in meshing engagement with the drive gear 284, and the fourth driven gear 299 is in meshing engagement with the drive gear 285.

The output shaft 206 is equipped with a first synchronizer 300 between the first driven gear 296 and the second driven gear 297 and a second synchronizer 301 between the third driven gear 298 and the fourth driven gear 299. The first synchronizer 300 is given the known structure which is composed of: an annular clutch hub 302 splined to the output shaft 206; synchronizer rings 303 and 304 disposed at the two sides of the clutch hub 302; and a sleeve 305 fitted on the outer circumference of the clutch hub 302. The second synchronizer 301 is given the known structure which is composed of: an annular clutch hub 306 splined to the output shaft 206; synchronizer rings 307 and 308 disposed at the two sides of the clutch hub 306; and a sleeve 309 fitted on the outer circumference of the clutch hub 306.

As a result, the torque of the input shaft 305 is not transmitted to the output shaft 306 when the first synchronizer 300 and the second synchronizer 301 are in neutral positions. On the other hand, when either the first synchronizer 300 or the second synchronizer 301 is moved in one of the axial directions M to connect the output shaft 206 to any of the first driven gear 296, the second driven gear 297, the third driven gear 298 and the fourth driven gear 299, the torque of the input shaft 205 is transmitted to the output shaft 206.

The aforementioned transmission N is equipped therein with a reverse idle gear 313, which is in meshing engagement with the reverse driven gear 292. Incidentally, this meshing engagement is not illustrated in FIG. 15 because of the location of the section. The reverse idle gear 313 is substantially identical in the phase of the axial direction M to the reverse driven gear 292, and its gear shaft 314 is arranged with an axis P in parallel with the axes M, L and K. One end of this gear shaft 314 is held by a bracket 318 which is fixed on the partition portion 211 of the first case 201 by screws 317. Incidentally, the other end side of the gear shaft 314 is fitted in an axial bore 319 formed in the second case 202. The aforementioned reverse driven gear 276, reverse driven gear 292 and reverse idle gear 313 correspond to the reverse gear of the present invention.

Figure 17:
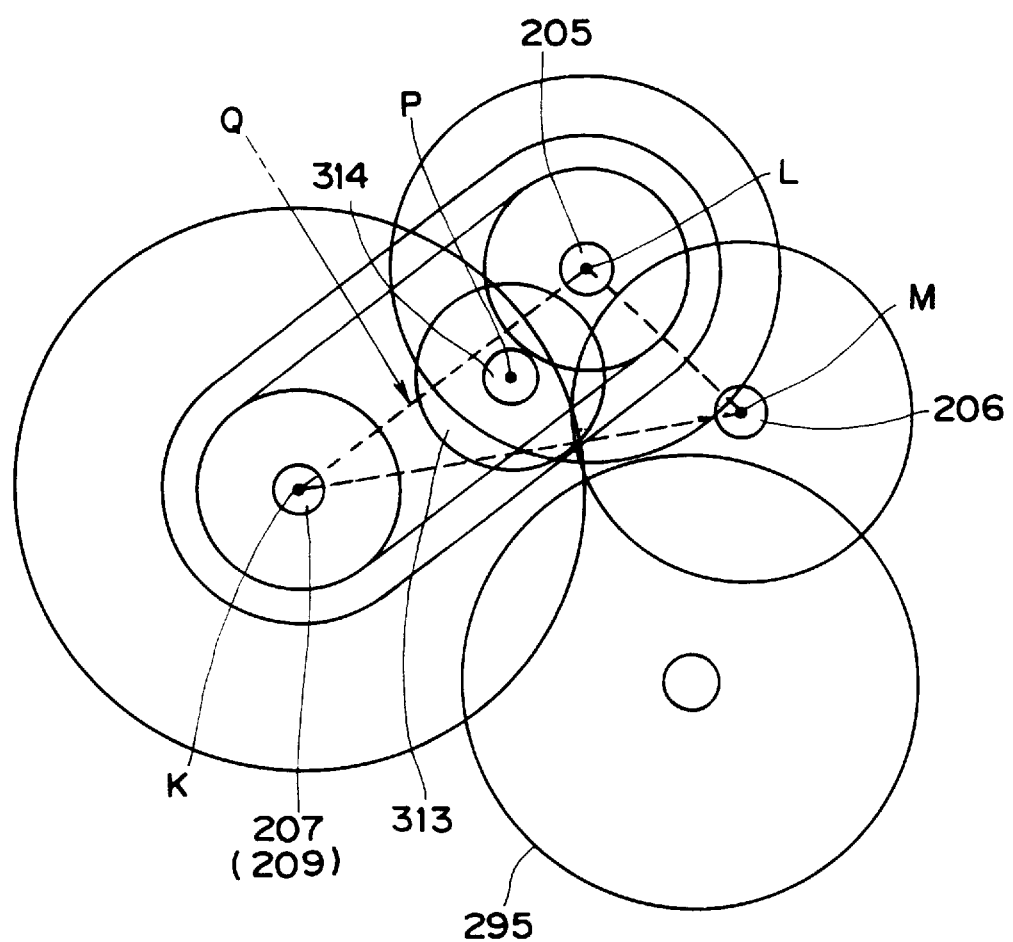
FIG. 17 is an arrangement plan of an input shaft, a motor shaft and an output shaft of the hybrid drive system of the sixth embodiment of the present invention, as viewed from the shaft end side.

FIG. 17 is an arrangement plan showing the individual shafts, as viewed from the shaft end side. The hybrid drive system is mounted in the so-called "transverse arrangement", in which the axes of the individual shafts are perpendicular to the longitudinal direction of the vehicle. Of the individual shafts, the motor shaft 207 and the crankshaft 209 are arranged in the foremost position of the vehicle, and the input shaft 205 and the output shaft 206 are arranged at the back of the former shafts. Moreover, the input shaft 205, the motor shaft 207 and the output shaft 206 are arranged in such positions that a triangular area Q is formed in a plane normal to the individual axes by the dotted lines joining the axis L, the axis K and the axis M. Moreover, the gear shaft 314 of the reverse idle gear 313 is so arranged that its axis P is positioned within the triangular area Q. Incidentally, the run of the vehicle using this hybrid drive system may be controlled by the controls tabulated in FIG. 14.

Thus, in the sixth embodiment, the motor shaft 207, the input shaft 205 and the output shaft 206 are arranged in parallel with one another so that the total length of the hybrid drive system can be shortened in the axial direction. As a result, there can be achieved effects that the moutability of the vehicle and the arrangement of the peripheral devices is less restricted, and that the floor of the vehicle is flattened in the compartment to improve the accommodation of the compartment. Moreover, the hybrid drive system is mounted in the transverse position on the vehicle, and the input shaft and the output shaft are arranged at the back of the motor shaft so that the area for arranging the individual shafts in the longitudinal direction is narrowed to further improve the mountability.

In the sixth embodiment, moreover, the planetary gear mechanism 220, and the reverse drive gear 276, the reverse driven gear 292 and the reverse idle gear 313 are arranged at the same position, as taken in the axial direction. As a result, the area for arranging the individual gears in the axial direction can be narrowed to further shorten the total length of the hybrid drive system in the axial direction.

In the sixth embodiment, furthermore, the body portion 234, the cover portion 235 and the stator 250 are fixed in the circumferential direction by the single key 249. As a result, the number of parts for the fixing can be reduced. At the assembling process of the hybrid drive system, on the other hand, the body portion 234, the cover portion 235 and the stator 250 can be fixed in position by the simple works of merely moving them linearly. As a result, the number of assembling steps can be suppressed to a value as small as possible to improve the assembling ease and the productivity.

In the sixth embodiment, furthermore, the input shaft 205, the motor shaft 207 and the output shaft 206 are arranged at the positions in which the triangular area Q is formed by the dotted lines joining their axes L, K and M. In addition, the gear shaft 314 is so arranged that its axis P is within the triangular area Q. As a result, the area for the arrangement in the direction generally perpendicular to the individual axes can be suppressed to reduce the size of the hybrid drive system further in the longitudinal direction of the vehicle.

When the parking range is selected in the sixth embodiment, furthermore, the parking gear 283 comes into meshing engagement with the rotation restricting member in the transmission N, i.e., the (not-shown) parking lock pole. By the action of the first synchronizer 300, moreover, the first driven gear 296 and the output shaft 206 are connected. As a result, the first driven gear 296 and the drive gear 281 take the torque transmitting state to restrict the rotations of the output shaft 206 and the first gear shaft 279 by the gradient of the road surface or the external force. Here, the gear ratio between the first driven gear 296 and the drive gear 281 is higher than those between other driven gears and drive gears so that a high rotation restricting force is applied to the output shaft 206 merely by imparting a low stopping force to the parking gear 283. As a result, there can be achieved an effect that the vehicle can be reliably stopped to improve the safety.

In the sixth embodiment, on the other hand, a substantial half of the motor case 233 accommodating the motor generator 204 is arranged in the space which is formed by the sprocket 226 and the silent chain 278, and the first clutch mechanism 288. As a result, the inter-axis distance between the motor shaft 207 and the input shaft 205 can be shortened to narrow the area for arranging the hybrid drive system in the direction perpendicular to the axis.

In the sixth embodiment, furthermore, the motor case 233 is kept liquid-tight by the sealing device such as the oil seals 256 and 242 or the O-ring 266 so that the oil in the transmission N can be prevented from invasion into the motor case 233. As a result, the magnetic field or rotation to be established by the motor generator 204 can be kept so satisfactory as to exhibit the stable driving characteristics for a long time period.

Figure 18:
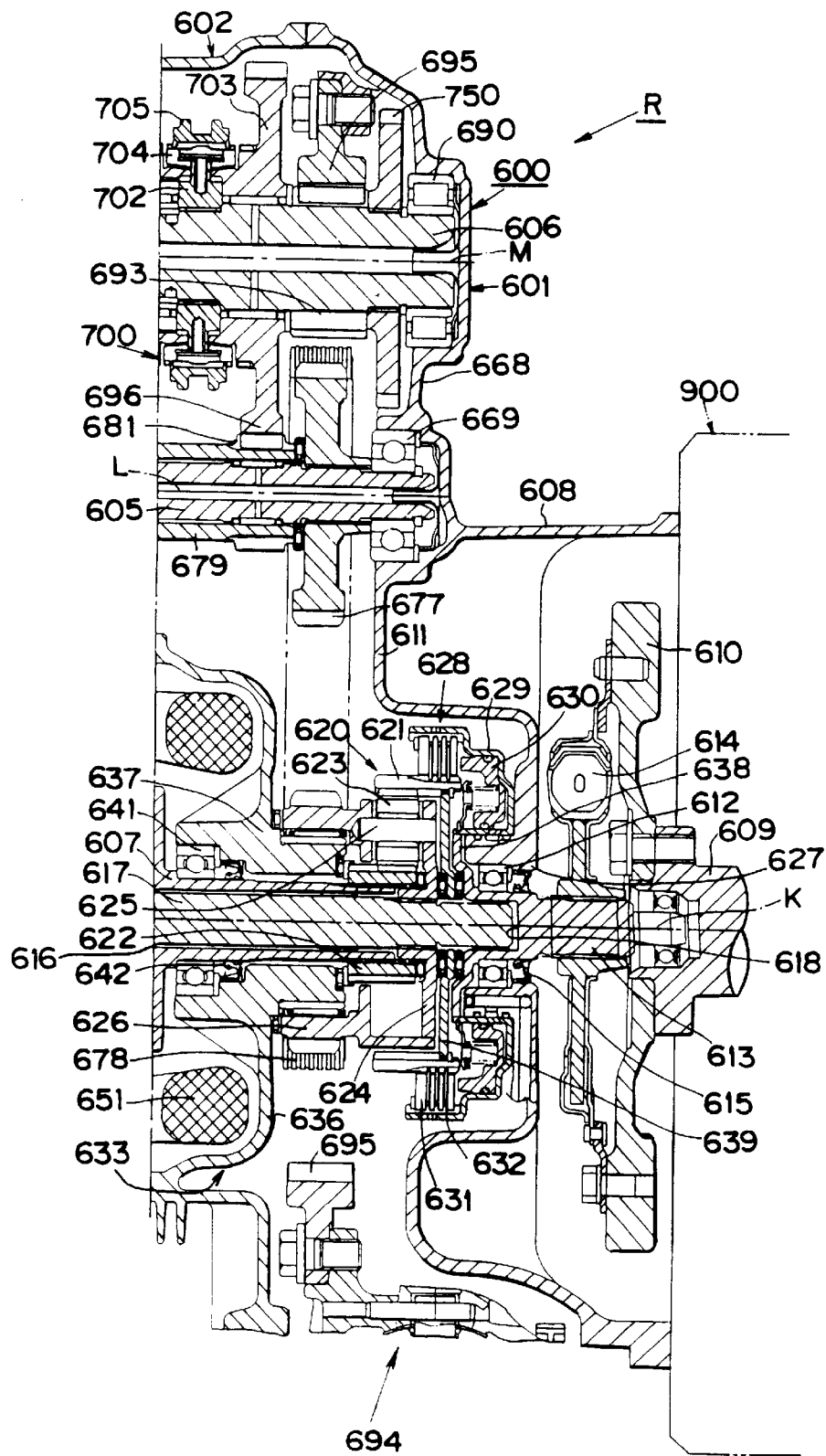
FIG. 18 is a section showing one divided half of a hybrid drive system according to a seventh embodiment of the present invention.
Figure 19:
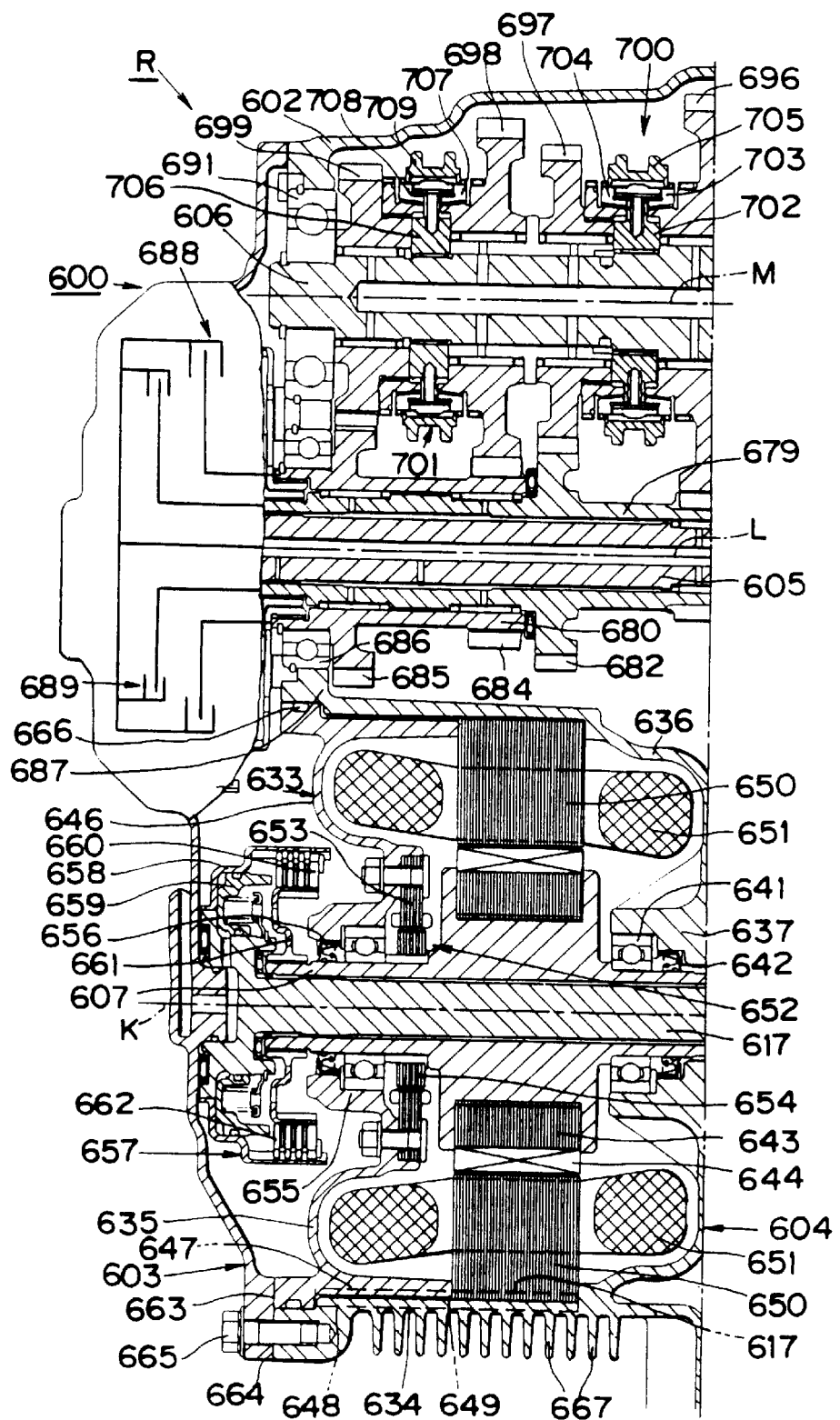
FIG. 19 is a section showing the other half of the hybrid drive system according to the seventh embodiment of the present invention.

FIGS. 18 and 19 are sections showing a hybrid drive system according to a seventh embodiment in a divided manner. At the back of the internal combustion engine 900, in this seventh embodiment, there is disposed a transmission R, which is provided with a hollow housing 600. This housing 600 is constructed by fixing a first case 601 and a cover 603 separately on the two sides of a second case 602. A motor generator 604 is arranged in parallel with the transmission R, and an input shaft 605 and an output shaft 606 are arranged in the housing 600. Moreover, a motor shaft 607 of the motor generator 604 is arranged in parallel with the input shaft 605 and the output shaft 606.

The first case 601 is provided with a cylindrical portion 608 which centers the axis K of the motor shaft 607. In the cylindrical portion 608, there is fitted the rear end of a crankshaft 609 of the internal combustion engine 900. This crankshaft 609 corresponds to the drive shaft of the present invention. Thus, the motor shaft 607 and the crankshaft 609 are arranged on the common axis K, whereas a flywheel 610 is fixed on the rear end of the crankshaft 609.

Moreover, the cylindrical portion 608 is equipped in its inner circumference with a partition portion 611, which is equipped in its inner circumference with a boss 627 protruded toward the motor generator 604. By the inner circumference of the boss 627, there is supported through a bearing 612 a first transmission shaft 613. This first transmission shaft 613 is equipped on the outer circumference of its end portion at the side of the crankshaft 609 with a damper 614, which connects the first transmission shaft 613 and the flywheel 610. Incidentally, the boss 627 is equipped in its inner circumference with an oil seal 615, which keeps the boss 627 and the first transmission shaft 613 liquid-tight.

Through the aforementioned motor shaft 607, on the other hand, there is extended along the axial direction K an axial bore 616, in which is fitted a second transmission shaft 617. This second transmission shaft 617 is made rotatable with the motor shaft 607, and is one end side is rotatably fitted in a retaining bore 618 formed in the first transmission shaft 613. The other end side of the second transmission shaft 617 is rotatably supported by a cylindrical support portion 619 which is protruded from the inner face of the cover 603.

On the other hand, the motor shaft 607 and the second transmission shaft 617 are equipped on the circumference of their end portions at the side of the partition portion 611 with a planetary gear mechanism 620. This planetary gear mechanism 620 is composed of: a ring gear 621; a sun gear 622 fitted on the outer circumference of the motor shaft 607; and a pinion gear 623 interposed between the ring gear 621 and the sun gear 622. To the second transmission shaft 617, there is splined an annular carrier 624, which supports the pinion gear 623 by its pinion pin 625. To the other end side of this pinion pin 625, there is connected an annular sprocket 626, which corresponds to the input member or the transmission mechanism of the present invention.

The boss 627 is equipped therearound with a main clutch 628 for connecting/disconnecting the ring gear 621 and the first transmission shaft 613. The main clutch 628 is composed of an annular drum 629 which is bent to have a square section and opened toward the motor generator 604, and a piston 630 which is movably fitted in the drum 629 along the axial direction K. The main clutch 628 is further equipped with a plurality of discs 631 splined to the inner circumference of the drum 629, and a plurality of annular plates 632 splined to the outer circumference of the ring gear 621.

The inner circumferential end of the drum 629 is fixed on the outer circumferential end of an outward flange 638 of the first transmission shaft 613. Between the flange 638 and the carrier 624, on the other hand, there is interposed an annular plate 639, which holds the ring gear 621. This plate 639 is positioned by thrust bearings 640 which are disposed at the two sides of the plate 639. By the not-shown oil pressure source, moreover, the movement of the piston 630 is controlled to bring the discs 631 and the plates 632 into and out of abutment to connect/disconnect the first transmission shaft 613 and the ring gear 621.

The aforementioned motor generator 604 is accommodated in a motor case 633 which is disposed in the second case 602. The motor case 633 is composed of a cylindrical body portion 634 integrated with the second case 602, and a cover portion 635 closing the open end of the body portion 634 at the side of the cover 603. The body portion 634 is equipped at its inner circumferential end at the side of the partition portion 611 with a partition portion 636, the inner circumferential end of which is integrated with a cylindrical portion 637.

On the outer circumference of the cylindrical portion 637 at the side of the partition portion 611, there is rotatably fitted the aforementioned sprocket 626. In the inner circumference of the cylindrical portion at the side of the motor generator 604, on the other hand, there are fixed a bearing 641 which supports the motor shaft 607, and an oil seal 642 for keeping the motor shaft 607 liquid-tight therearound. An annular rotor 643 is fixed in the outer circumference of the motor shaft 607, and a magnet 644 is mounted in the outer circumferential portion of the rotor 643.

The cover portion 635 is composed of a cylindrical portion 645 fitted in the inner circumference of the body portion 634, and an end face portion 646 formed at the inner circumferential end of the cylindrical portion 645 at the side of the cover 603. In the outer circumferential face of the cylindrical portion 645 and the inner circumferential face of the body portion 634 and in a stator 650, there are formed key grooves 647, 648 and 717 which are extended in the axial direction K. By inserting a key 649 into those key grooves 647, 648 and 717, moreover, the cover portion 635 is circumferentially fixed with respect to the body portion 634, and the stator 650 is fixed at the same time.

Moreover, an external end face 663 of the cylindrical portion 645 and an external end face 664 of the second case 602 are set in a common plane. With the inner face of the cover 603 being in abutment against the external end face 663 and the external end face 664, the cover 603 is fixed on the second case 602 by fastening screws 665. Between the inner circumferential face of the second case 602 and the outer circumferential face of the cylindrical portion 645, there is sandwiched an O-ring 666 which keeps the inner face and the outer face 645 liquid-tight.

Thus, the motor case 633 is made light-tight by the oil seal 642, an oil seal 656 and the O-ring 666 so that the oil in the housing 600 is prevented from invasion into the motor case 633. Incidentally, the outer face of the body portion 634 is equipped with fins 667 for emitting the heat at the driving time of the motor generator 604 to cool the motor generator 604.

Between the inner end face of the aforementioned cylindrical portion 645 and the step portion of the inner circumference of the body portion 634, there is fixed the stator 650 which is arranged in the circumferential direction. A coil 651 is wound on the stator 650, and a small clearance is formed between the stator 650 and the rotor 643. In the motor generator 604 thus constructed, a magnetic field is established in the small clearance by the power supply from the not-shown battery. The motor generator 604 is provided with a power function to rotate in a predetermined direction, and a regenerative function to transform the mechanical energy into an electric energy to charge the battery with the electric energy.

In the vicinity of the motor generator 604, there is disposed a resolver 652 for detecting the angle of rotation of the motor generator 604. This resolver 652 is composed of: a stator 653 fixed on the end face portion 646; a rotor 654 fixed on the outer circumference of the motor shaft 607; and a coil wound on the stator 653. Moreover, the end face portion 646 is equipped in its inner circumference with a bearing 655 supporting the motor shaft 607 and the oil seal 656 keeping the end face portion 646 and the motor shaft 607 liquid-tight.

Moreover, the end portion of the motor shaft 607 at the side of the cover 603 and the end portion of the second transmission shaft 617 at the side of the cover 603 are connected/disconnected by a motor shaft clutch 657. This motor shaft clutch 657 is composed of a cylindrical drum 658 fixed on the outer circumferential end of the second transmission shaft 617, and a piston 659 so fitted in the inner circumference of the drum 658 as to move in the axial direction K. The motor shaft clutch 657 is further composed of: an annular disc 660 splined to the inner circumference of the drum 658; an annular clutch hub 661 fixed on the outer circumferential end of the motor shaft 607; and an annular plate 662 splined to the outer circumference of the clutch hub 661. By controlling the movement of the piston 659 by the not-shown oil pressure source, moreover, the motor shaft clutch 657 is applied/released.

The aforementioned first case 601 is equipped at the outer circumferential side of the cylindrical portion 608 with a bulging portion 668 which is generally perpendicular to the axis K. A bearing 669 is fixed in the inner circumference at the joint portion between the bulging portion 668 and the cylindrical portion 608. On the other hand, the inner face of the cover 603 is at a position opposed to the bearing 669 with the not-shown bearing, so that the two ends of the input shaft 605 is supported by the bearing 669 and the (not-shown) bearing.

To the input shaft 605 at the side of the bearing 669, on the other hand, there is splined a sprocket 677, which corresponds to the input member of the present invention. Between the sprocket 677 and the sprocket 626, there is tensed a silent chain 678, which corresponds to the input member or the transmission mechanism of the present invention. Moreover, the input shaft 605 is equipped with a first gear shaft 679 on its outer circumference closer to the cover 603 than the sprocket 677, and the first gear shaft 679 is equipped with a second gear shaft 680 on its outer circumference.

The first gear shaft 679 is equipped with drive gears 681 and 682, and the second gear shaft 680 is equipped with drive gears 684 and 685. Of these, the drive gear 684 is set to have an external diameter larger than that of the drive gear 681; the drive gear 682 is set to have an external diameter larger than that of the drive gear 684; and the drive gear 685 is set to have an external diameter larger than that of the drive gear 682.

The second gear shaft 680 is supported at its position closer to the cover 603 than the drive gear 685 by a bearing 686. This bearing 686 is supported by a protruding portion 687 which is formed at the end portion of the body portion 634 of the motor case 633. Incidentally, the input shaft 605, the first gear shaft 679 and the second gear shaft 680 are provided at their end portions at the side of the cover 603 with a first clutch mechanism 688 and a second clutch mechanism 689. The first clutch mechanism 688 is provided for connecting/disconnecting the input shaft 605 and the second gear shaft 680, and the second clutch mechanism 689 is provided for connecting/disconnecting the input shaft 605 and the first gear shaft 679.

Incidentally, a substantial half of the motor case 633 accommodating the aforementioned motor 604 is arranged in the space which is formed between the first clutch mechanism 688, and the silent chain 678 and the sprocket 626.

On the inner face of the aforementioned bulging portion 668 outside of the bearing 669, on the other hand, there is fixed a bearing 690, and the aforementioned protruding portion 687 is equipped at a position opposed to the bearing 690 with a bearing 691. These bearings 690 and 691 support the two ends of the output shaft 606.

To the output shaft 606 at the side of the bearing 690, on the other hand, there is splined a parking gear 750. In the housing 600, there is disposed the rotation restricting member, i.e., the (not-shown) parking lock pole for restricting the rotation of the output shaft 606 when it is brought into engagement with the parking gear 750. The parking gear 750 and the planetary gear mechanism 620 are arranged in the same position, as taken in the axial direction.

The output shaft 606 is equipped at a position closer to the cover 603 than the parking gear 750 with a final gear 693, which corresponds to the output member of the present invention. This final gear 693 is in meshing engagement with a ring gear 695 of a differential 694, as disposed in the vicinity of the transmission R. Incidentally, the final gear 693, the sprockets 626 and 677 and the silent chain 678 are arranged in the same position, as taken in the axial direction.

The output shaft 606 is further equipped with a first driven gear 696, a second driven gear 697, a third driven gear 698 and a fourth driven gear 699 at a predetermined interval from the vicinity of the final gear 693 to the bearing 691. The first driven gear 696, the second driven gear 697, the third driven gear 698, the fourth driven gear 699 and the output shaft 606 are made rotatable relatively one another. The first driven gear 696 meshes with the drive gear 681, and the second driven gear 697 meshes with the drive gear 682. The third driven gear 698 meshes with the drive gear 684, and the fourth driven gear 699 meshes with the drive gear 685.

The output shaft 606 is equipped with a first synchronizer 700 between the first driven gear 696 and the second driven gear 697 and a second synchronizer 701 between the third driven gear 698 and the fourth driven gear 699. The first synchronizer 700 is given the known structure which is composed of: an annular clutch hub 702 splined to the output shaft 606; synchronizer rings 703 and 704 disposed at the two sides of the clutch hub 702; and a sleeve 705 fitted on the outer circumference of the clutch hub 702.

The second synchronizer 701 is given the known structure which is composed of: an annular clutch hub 706 splined to the output shaft 606; synchronizer rings 707 and 708 disposed at the two sides of the clutch hub 706; and a sleeve 709 fitted on the outer circumference of the clutch hub 706.

As a result, the torque of the input shaft 605 is not transmitted to the output shaft 606 when the first synchronizer 700 and the second synchronizer 701 are in neutral positions. On the other hand, when either the first synchronizer 700 or the second synchronizer 701 is moved in one of the axial directions M to connect the output shaft 606 to any of the first driven gear 696, the second driven gear 697, the third driven gear 698 and the fourth driven gear 699, the torque of the input shaft 605 is transmitted to the output shaft 606.

Figure 20:
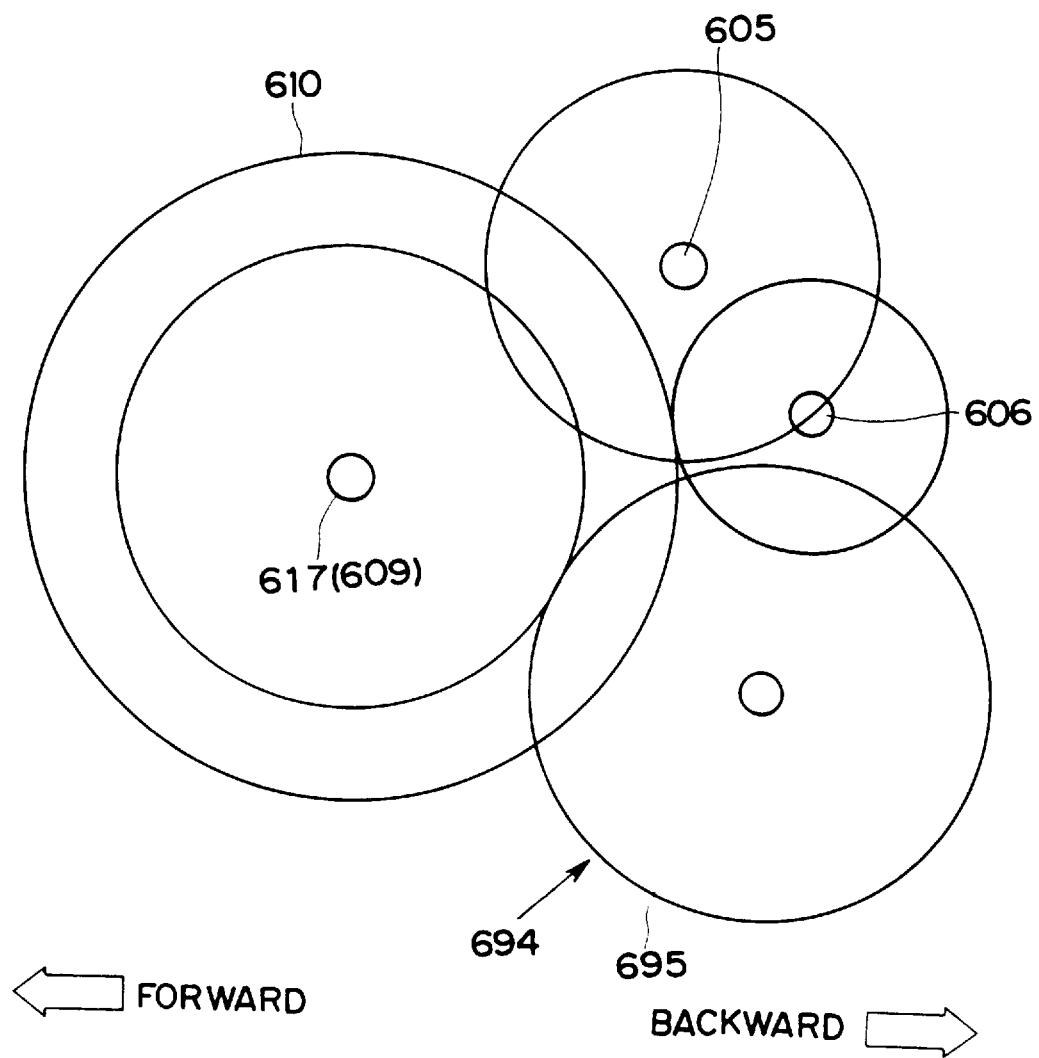
FIG. 20 is an arrangement plan of an input shaft, a motor shaft and an output shaft of the hybrid drive system of the seventh embodiment of the present invention, as viewed from the shaft end side.

FIG. 20 is an arrangement plan showing the individual shafts, as seen from the shaft end side. The individual shafts are arranged at a right angle with respect to the longitudinal direction of the vehicle, so that the transverse arranging method is adopted for the hybrid drive system as a whole. Of the individual shafts, the motor shaft 607 and the crankshaft 609 are arranged in the foremost position of the vehicle, and the input shaft 605, the output shaft 606 and so on are arranged at the back of the motor shaft 607.

When this hybrid drive system is applied to the vehicle, the running modes at the forward stage are controlled like the running modes, as shown in FIG. 14. Incidentally, when the mode of the reverse stage is selected, the motor generator 604 may be driven in the direction opposite to that of the forward stages by releasing the main clutch 638 and by applying the motor shaft clutch 657.

Thus, in the seventh embodiment, the motor shaft 607, the input shaft 605 and the output shaft 606 are arranged in parallel with one another so that the total length of the hybrid drive system can be shortened in the axial direction. As a result, there are achieved effects that the mountability for the vehicle and the arrangement of the peripheral devices is less restricted, and that the floor is flattened at the compartment side to improve the accommodation of the compartment.

In the seventh embodiment, moreover, the hybrid drive system is of the transverse type, and the input shaft 605 and the output shaft 606 are arranged at the back of the motor shaft 607, so that the area for arranging the individual shafts in the longitudinal direction of the vehicle is suppressed to improve the mountability in the longitudinal direction of the vehicle.

In the seventh embodiment, furthermore, the body portion 634, the cover portion 635 and the stator 650 are circumferentially fixed by the single key 649 so that the number of parts for the fixing can be reduced. At the assembling process of the hybrid drive system, moreover, the body portion 634, the cover portion 635 and the stator 650 can be fixed in position by the simple works of merely moving them linearly in the axial direction so that the number of assembling steps is reduced to improve the assembling ease and the productivity.

In the seventh embodiment, furthermore, the parking gear 750 and the planetary gear mechanism 620 are disposed in the same position, as taken in the axial direction, so that the area for mounting the parts in the axial direction can be narrowed to further shorten the total length of the hybrid drive system in the axial direction.

In the seventh embodiment, furthermore, the sprockets 626 and 677, the silent chain 678 and the final gear 693 are arranged in the same position, as taken in the axial direction. As a result, the area for arranging the individual parts in the axial direction can be narrowed to further shorten the total length of the hybrid drive system in the axial direction.

On the other hand, the motor generator 604 is arranged in the space which is formed between the first clutch mechanism 688, and the sprocket 626 and the silent chain 678. As a result, the inter-axis distance between the input shaft 605 and the motor shaft 607 can be narrowed to reduce the size of the hybrid drive system in the direction perpendicular to the axial direction.

In the seventh embodiment, furthermore, the motor case 633 is kept liquid-tight by the sealing device such as the oil seals 656 and 642 and the O-ring 666 so that the oil in the transmission R can be prevented from invasion into the motor case 633. As a result, the magnetic field and rotation to be established by the motor generator 604 can be kept so satisfactory as to exhibit the stable driving characteristics for a long time period.

What is claimed is:

1. A hybrid drive system for outputting the power of an internal combustion engine and the power of a motor generator through a transmission, comprising:

an input shaft for inputting the power to said transmission;

an output shaft for outputting the power from said transmission;

a motor shaft for inputting/outputting the power to and from said motor generator; and a drive shaft for the output of said internal combustion engine, wherein said motor shaft is arranged in parallel with said input shaft and said output shaft, and said motor shaft, input shaft and output shaft are all spaced from each other in a direction perpendicular to their central axes; and wherein said drive shaft is arranged on the same axis as that of said motor shaft.

2. A hybrid drive system according to claim 1, further comprising:
an input member arranged on said input shaft for transmitting the output torque of said internal combustion engine and said motor generator to said input shaft; and
an output member arranged on said output shaft and at the same position in the axial direction as that of said input member for outputting the torque from said output shaft.

3. A hybrid drive system according to claim 2,
wherein said input member includes a gear train for transmitting the torque between said motor shaft and said drive shaft and said input shaft.

4. A hybrid drive system according to claim 2,
wherein said input member includes a chain and a sprocket for transmitting the torque between said motor shaft and said drive shaft and said input shaft.

5. A hybrid drive system according to claim 1, further comprising:
a hollow housing accommodating said transmission, said input shaft and said output shaft; and
a motor case integrated with said housing and accommodating said motor generator liquid-tight.

6. A hybrid drive system according to claim 1, further comprising:
a working liquid confined in said transmission; and
a rotary member disposed in said transmission and made rotatable for feeding said working liquid against an outer cover of said motor generator to cool said motor generator.

7. A hybrid drive system according to claim 6,
wherein said rotary member includes a chain tensed between a sprocket mounted on the motor shaft of said motor generator and a sprocket mounted on said input shaft.

8. A hybrid drive system according to claim 6, further comprising a guide member disposed in said transmission for guiding the working liquid, as fed by said rotary member, against an outer cover of said motor generator.

9. A hybrid drive system according to claim 8, further comprising a housing accommodating said motor generator liquid-tight and accommodating said transmission,
wherein said guide member includes a protruding portion formed in said housing at an inclination toward said motor generator.

10. A hybrid drive system according to claim 1, further comprising:
at least one clutch mechanism which is arranged on the same axis as said input shaft and the largest-diameter one of which is arranged at one end of said input shaft; and
a transmission mechanism arranged at the other end of said input shaft for transmitting the torque between said input shaft and said motor shaft,
wherein said motor generator is arranged between said largest-diameter clutch mechanism and said transmission mechanism in the axial direction.

11. A hybrid drive system according to claim 10, further comprising a plurality of gears having different external diameters and arranged on said input shaft between said clutch mechanism and said transmission mechanism at a spacing from one another in the axial direction,
wherein two of said gears having the larger diameters of said external diameters are separately arranged near the two ends of said input shaft.

12. A hybrid drive system according to claim 1, further comprising:
a main clutch arranged between said drive shaft and said motor shaft, as arranged on the common axis, for connecting said drive shaft and said motor shaft selectively; and
a piston arranged on said motor shaft at and end portion opposed to said drive shaft for pushing and releasing said main clutch.

13. A hybrid drive system according to claim 12, further comprising a shaft member extending through said motor shaft in the axial direction for transmitting the pushing force of said piston to said main clutch.

14. A hybrid drive system according to claim 10, further comprising:
a main clutch arranged between said drive shaft and said motor shaft, as arranged on the common axis, for connecting said drive shaft and said motor shaft selectively; and
a piston arranged on said motor shaft at an end portion opposed to said drive shaft for pushing and releasing said main clutch,
wherein said piston and said largest-diameter clutch mechanism are arranged at the same position, as taken in the axial direction.

15. A hybrid drive system according to claim 14, further comprising a single oil pressure source for producing an oil pressure for actuating said piston and an oil pressure for actuating said at least one clutch mechanism.

16. A hybrid drive system according to claim 15,
wherein said oil pressure source includes a pump for sucking and pressurizing the working liquid in said transmission.

17. A hybrid drive system according to claim 1, further comprising:
a planetary gear mechanism arranged on the common axis, as shared by said drive shaft and said motor shaft, for transmitting the torque between said drive shaft, said motor shaft and said input shaft; and
a reverse gear train arranged at an outer circumferential side of said planetary gear mechanism for reversing said output shaft.

18. A hybrid drive system according to claim 17, further comprising a reverse clutch mechanism for transmitting the torque selectively from said input shaft to said reverse gear train.

19. A hybrid drive system according to claim 1, further comprising:
reverse gears individually mounted on said input shaft and said output shaft; and
an idle gear for connecting said reverse gears,
wherein said input shaft, said output shaft and said motor shaft are arranged in such positions that a triangular area is formed by the segments joining the centers of said individual shafts, and
wherein said idle gear is arranged in said triangular area.

20. A hybrid drive system according to claim 5, further comprising:
a cylindrical body portion forming a portion of said motor case;
a cover portion having a cylindrical portion to be fitted in the inner circumference of said body portion;
a stator forming a portion of said motor generator and fixed in the inner circumferential face of said body portion;

key grooves individually formed in the inner circumferential face of said body portion, in the outer circumferential face of said cover portion and in said stator and oriented in the axial direction of said motor shaft; and a single key for fixing said body portion, said cover portion and said stator, as fitted in said key grooves, mutually in the circumferential direction.

21. A hybrid drive system according to claim 1, further comprising a parking gear mounted on said input shaft for meshing with a rotation regulating member selectively to regulate the rotation of said output shaft.

22. A hybrid drive system according to claim 1, further comprising:

a planetary gear mechanism arranged on the common axis, as shared by said drive shaft and said motor shaft, for transmitting the torque between said drive shaft, said motor shaft and said input shaft; and a parking gear arranged at the outer circumferential side of said planetary gear mechanism and mounted on said output shaft for meshing with a rotation regulating member selectively to stop the rotation of said output shaft.

23. A hybrid drive system according to claim 1, further comprising:

a parking gear mounted on said input shaft for meshing with a rotation regulating member at the time of setting a parking range, to stop the rotation of said input shaft; and a low-speed gear train for transmitting the torque in said parking range.

24. A hybrid drive system according to claim 23, further comprising a connection mechanism for connecting said low-speed gear train selectively to said input shaft and said output shaft in a torque transmitting manner.

25. A hybrid drive system according to claim 1, wherein said internal combustion engine, said transmission and said motor generator are so mounted on a vehicle that the axes of the individual shafts are perpendicular to the longitudinal direction of the vehicle, wherein said internal combustion engine is so arranged that said drive shaft and said motor shaft are positioned on the common axis, and wherein said input shaft and said output shaft are arranged at a position of the vehicle farther toward the rear of the vehicle than said motor shaft.

26. A hybrid drive system for outputting the power of an internal combustion engine and the power of a motor generator through a transmission, comprising:

an input shaft for inputting the power to said transmission;

an output shaft for outputting the power from said transmission;

a motor shaft for inputting/outputting the power to and from said motor generator; and a drive shaft for the output of said internal combustion engine, wherein said motor shaft is arranged in parallel with said input shaft and said output shaft, and said motor shaft, input shaft and output shaft are all spaced from each other in a direction perpendicular to their central axes; and wherein said drive shaft is arranged on the same axis as that of said input shaft.

27. A hybrid drive system according to claim 26, further comprising:

an input member arranged on said input shaft for transmitting the output torque of said internal combustion engine and said motor generator to said input shaft; and an output member arranged on said output shaft and at the same position in the axial direction as that of said input member for outputting the torque from said output shaft.

28. A hybrid drive system according to claim 27, wherein said input member includes a gear train for transmitting the torque between said motor shaft and said drive shaft and said input shaft.

29. A hybrid drive system according to claim 27, wherein said input member includes a chain and a sprocket for transmitting the torque between said motor shaft and said drive shaft and said input shaft.

30. A hybrid drive system according to claim 26, further comprising:

hollow housing accommodating said transmission, said input shaft and said output shaft; and a motor case integrated with said housing and accommodating said motor generator liquid-tight.

31. A hybrid drive system according to claim 26, further comprising:

a working liquid confined in said transmission; and a rotary member disposed in said transmission and made rotatable for feeding said working liquid against an outer cover of said motor generator to cool said motor generator.

32. A hybrid drive system according to claim 31, wherein said rotary member includes a chain tensed between a sprocket mounted on the motor shaft of said motor generator and a sprocket mounted on said input shaft.

33. A hybrid drive system according to claim 31, further comprising a guide member disposed in said transmission for guiding the working liquid, as fed by said rotary member, against an outer cover of said motor generator.

34. A hybrid drive system according to claim 33, further comprising a housing accommodating said motor generator liquid-tight and accommodating said transmission, wherein said guide member includes a protruding portion formed in said housing at an inclination toward said motor generator.

35. A hybrid drive system according to claim 26, further comprising:

at least one clutch mechanism which is arranged on the same axis as said input shaft and the largest-diameter one of which is arranged at one end of said input shaft; and a transmission mechanism arranged at the other end of said input shaft for transmitting the torque between said input shaft and said motor shaft, wherein said motor generator is arranged between said largest-diameter clutch mechanism and said transmission mechanism in the axial direction.

36. A hybrid drive system according to claim 35, further comprising a plurality of gears having different external diameters and arranged on said input shaft between said clutch mechanism and said transmission mechanism at a spacing from one another in the axial direction, wherein two of said gears having the larger diameters of said external diameters are separately arranged near the two ends of said input shaft.

37. A hybrid drive system according to claim 30, further comprising:

a cylindrical body portion forming a portion of said motor case;

a cover portion having a cylindrical portion to be fitted in the inner circumference of said body portion;

a stator forming a portion of said motor generator and fixed in the inner circumferential face of said body portion;

key grooves individually formed in the inner circumferential face of said body portion, in the outer circumferential face of said cover portion and in said stator and oriented in the axial direction of said motor shaft; and a single key for fixing said body portion, said cover portion and said stator, as fitted in said key grooves, mutually in the circumferential direction.

* * * * *

UNITED STATES PATENT AND TRADEMARK OFFICE
CERTIFICATE OF CORRECTION

PATENT NO.   : 5,875,691
DATED        : March 2, 1999
INVENTOR(S)  : Hiroshi HATA, Seitoku KUBO, Yutaka TAGA and Ryuji IBARAKI It is certified that error appears in the above-identified patent and that said Letters Patent is hereby corrected as shown below:

Claim 12, line 7, change "at and end portion" to --at an end portion--.

Signed and Sealed this

Twenty-ninth Day of June, 1999

Attest:

Q. TODD DICKINSON

*Attesting Officer*     *Acting Commissioner of Patents and Trademarks*